United States Patent [19]

Saunders et al.

[11] Patent Number: 5,347,312
[45] Date of Patent: Sep. 13, 1994

[54] MOTION COMPENSATED VIDEO SIGNAL PROCESSING

[75] Inventors: Nicholas I. Saunders, Basingstoke; Stephen M. Keating; Carl W. Walters, both of Reading, all of United Kingdom

[73] Assignee: Sony United Kingdom Limited, Staines, United Kingdom

[21] Appl. No.: 988,440

[22] Filed: Dec. 9, 1992

[30] Foreign Application Priority Data

Jan. 24, 1992 [GB] United Kingdom ............ 9201612.0

[51] Int. Cl.⁵ .............................................. H04N 7/01
[52] U.S. Cl. ................................... 348/443; 348/699; 348/700

[58] Field of Search ................. 358/105, 140, 11; 348/443, 699, 700; H04N 7/01

[56] References Cited

U.S. PATENT DOCUMENTS 5,005,077  4/1991  Samad ................... 358/140
5,181,111  1/1993  Hedley .................. 358/140

Primary Examiner—Howard W. Britton
Attorney, Agent, or Firm—William S. Frommer; Alvin Sinderbrand

[57] ABSTRACT

Pairs of temporally adjacent input images are interpolated to produce motion compensated images using motion vectors generated from said but not all of the pairs of input images from which the output images are interpolated.

24 Claims, 18 Drawing Sheets

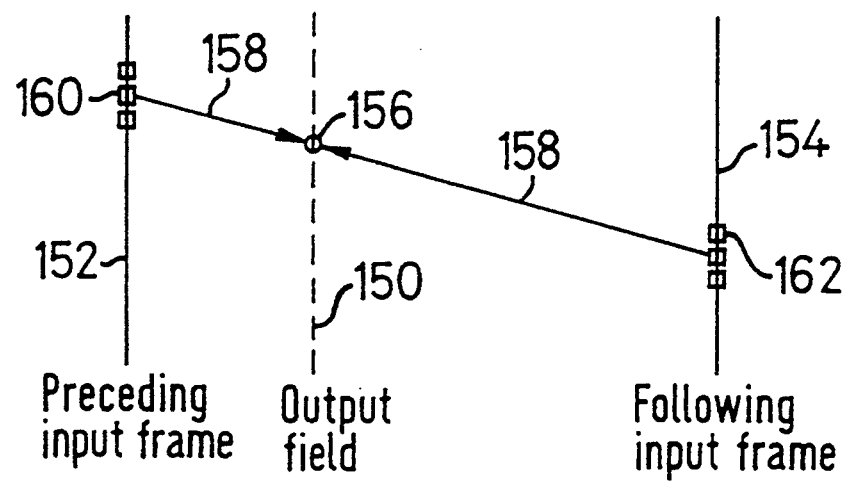
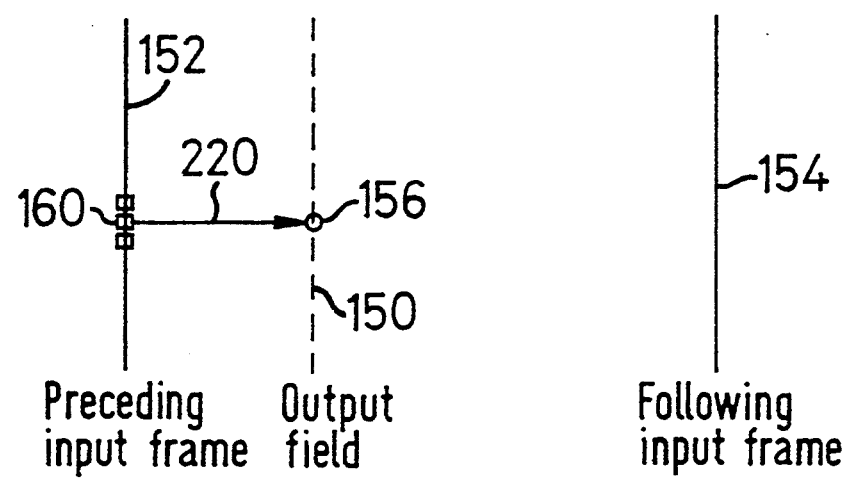
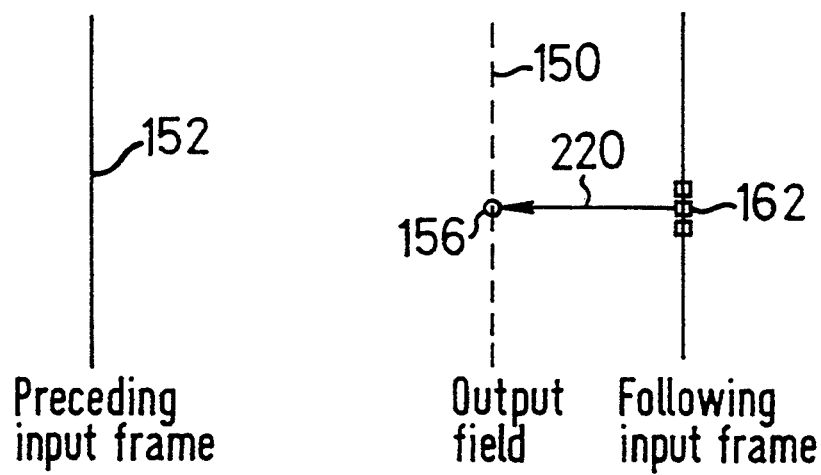

MOTION COMPENSATED VIDEO SIGNAL PROCESSING

BACKGROUND OF THE INVENTION

1. Field of the Invention

This invention relates to the field of motion compensated video signal processing.

2. Description of the Prior Art

Motion compensated video signal processing is used in video signal processing applications such as television standards conversion, film standards conversion or video to film conversion. An example of a previously proposed motion compensated video processing apparatus is described in the British Published Patent Application number GB-A-2 231 749, in which pairs of temporally adjacent images (fields or frames) of a digital video signal are processed to generate corresponding sets of motion vectors. The processing is carried out on discrete blocks of the images, so that each motion vector represents the inter-image motion of the contents of a respective block.

Each set of motion vectors is then supplied to a motion vector reducer which derives a subset of the set of motion vectors for each block, which is then passed to a motion vector selector which assigns one of the subset of motion vectors to each picture element (pixel) in each block of the image. The selected motion vector for each pixel is supplied to a motion compensated interpolator which interpolates output images from the input images, taking into account the motion between the input images.

Motion compensated video signal processing such as that described above requires powerful and complex processing apparatus to carry out the very large number of calculations required to generate and process motion vectors for each pair of input images. This is particularly true if the processing is to be performed on an input video signal to produce an output video signal in real time, in which case multiple sets of identical apparatus may be operated in parallel in order to generate sets of motion vectors for each output image in the time available (e.g. an output field period).

SUMMARY OF THE INVENTION

It is an object of the invention to reduce the processing capacity required by a video signal processing apparatus.

This invention provides a video signal processing apparatus for interpolating output images of an output video signal from corresponding pairs of temporally adjacent input images of an input video signal, said video signal processing apparatus comprising:

(I) a motion vector processor for generating, for use in interpolation, sets of motion vectors from pairs of temporally adjacent input images comprising some but not all of said pairs of temporally adjacent input images corresponding to output images;

(II) selecting means for selecting a set of motion vectors for use in interpolation of a current output image; and (III) a motion compensated interpolator for interpolating said current output image from a corresponding pair of temporally adjacent input images using said selected set of motion vectors.

As mentioned above, motion compensated video signal processing places great demands on the processing capacity of a video signal processing apparatus. The invention recognises that by generating motion vectors for only some of the pairs of input images corresponding to output images in a video signal processing apparatus, these demands can be relaxed. In particular, the time available for motion vector generation in an apparatus operating to produce an output video signal in real time is increased. This can obviate or reduce the need for parallel processing of the sets of motion vectors, leading to a reduction in the complexity, and the corresponding cost and size, of the apparatus.

Although the motion vector processor could generate sets of motion vectors from pairs of temporally adjacent input images corresponding to some of the output images and also from some or all of the pairs not corresponding to output images, in one preferred embodiment the motion vector processor is operable to generate sets of motion vectors only from pairs of temporally adjacent input images corresponding to a subset of the output images. Preferably the subset comprises alternate ones of the output images.

In one preferred embodiment, for an output image in the subset, the selecting means is operable to select the set of motion vectors generated from the pair of input images corresponding to that output image; and for an output image not in the subset, the selecting means is operable to select a set of motion vectors generated from a pair of input images corresponding to another output image temporally adjacent to that output image.

The selecting means could be operable to select, for an output image not in the subset, a set of motion vectors generated from a pair of input images corresponding to a predetermined output image, such as an output image temporally preceding that output image, or alternatively the selecting means could be operable to select a set of motion vectors generated from a pair of temporally adjacent input images which is closest to the temporal position of the output image.

In a preferred embodiment the selecting means comprises: means for assigning an index number to each of the input images, the index numbers representing the temporal position of the respective input image; means for calculating an index number representing the temporal position of each of the output images; and means for selecting a set of motion vectors, for use in interpolation of an output image, generated from a pair of input images having index numbers closest to the index number of that output image.

Preferably the selecting means comprises: a switchable delay for selectively delaying the sets of motion vectors for use in interpolating an output image not in the subset, thereby selecting between a current set of motion vectors and a previous set of motion vectors.

The invention is suitable for use in a number of applications, an example being one in which the input video signal comprises a plurality of video frames. Because an interlaced video signal may be supplied to the apparatus it is preferable to employ means for receiving an interlaced video signal and a progressive scan converter for converting pairs of temporally adjacent video fields in the interlaced video signal into respective video frames of the input video signal.

In one alternative preferred embodiment the apparatus comprises means for receiving an interlaced video signal and a progressive scan converter for converting pairs of temporally adjacent video fields in the interlaced video signal into respective video frames of the input video signal; and the motion vector processor is operable to generate sets of motion vectors only from pairs of temporally adjacent input images originating from a single frame of the interlaced video signal.

In another alternative preferred embodiment the apparatus comprises means for receiving an interlaced video signal and a progressive scan converter for converting pairs of temporally adjacent video fields in the interlaced video signal into respective video frames of the input video signal; and the motion vector processor is operable to generate sets of motion vectors only from pairs of temporally adjacent input images originating from a two adjacent frames of the interlaced video signal.

The output video signal may be field or frame based; in a preferred configuration the output video signal comprises a plurality of interlaced video fields.

An apparatus in which two or more output images are interpolated using a single set of motion vectors as described above can be particularly susceptible to scene changes or other dynamic video effects in the input video signal. Scene changes can appear to the motion vector generator as rapid and random motion of the images, leading to the generation of spurious and potentially large motion vectors. This can in turn lead to poor interpolation and distortion of the two or more output images interpolated using that set of motion vectors. In order that possible scene changes can be detected and appropriate action taken it is preferred that the video signal processing apparatus comprises: an analyzer for performing a predetermined test for each set of motion vectors to obtain a respective test result indicative of the degree of correlation between the pair of temporally adjacent input images from which that set of motion vectors was generated and for detecting a change of at least a predetermined size in the test results obtained for successive sets of motion vectors, thereby indicating a possible scene change in the input video signal. This is particularly useful when the motion compensated interpolator is operable to interpolate an output image from a corresponding pair of temporally adjacent input images using the selected set of motion vectors when a possible scene change is not indicated, and to generate an output image by intra-image processing of one of the corresponding pair of input images when a possible scene change is indicated.

This embodiment provides for the detection of possible scene changes from the sets of motion vectors themselves, by performing a predetermined test on each set of motion vectors and checking for a sudden change in the test result. When a possible scene change is detected the output image is made to be dependent on only one input image, so avoiding the possibility of the output image including parts of input images from two different scenes. The video signal processing apparatus can operate in real time on 'live' video signals for which there is no advance information (such as an edit list) to indicate the temporal position of any scene changes.

The detection of possible scene changes is based on the detection of a change in a test result indicative of the degree of correlation between a pair of input images. If a scene change occurs which is undetectable by this technique then this means that by chance the images before and after the scene change are roughly correlated with one another, so this scene change would not be expected to have a detrimental effect on the operation of the interpolator. In other words, the fact that this scene change was not detected does not matter. Similarly, if the input video signal did not contain a scene change but was such that there was a sudden change in the test results obtained for successive sets of motion vectors, this event would be indicated as a possible scene change by the analyzer. However, since such an event would be likely to have a detrimental effect on the operation of the interpolator, this 'false positive' detection is advantageous as appropriate action (changing to intra-frame generation of that output image) can be taken.

If a scene change occurs between two temporally adjacent input images from which neither a set of motion vectors nor an output image is calculated then that scene change would not be detected by the analyzer. However, that scene change would have no effect whatsoever on the operation of the interpolator, so the fact that it goes undetected is immaterial.

When two or more output images are to be interpolated from corresponding pairs of input images using a single set of motion vectors, the detection of a scene change need not result in all of those two or more output images being generated by intra-frame processing if, when a possible scene change is indicated and the selected set of motion vectors is not a set generated from the pair of input images corresponding to an output image to be interpolated, the selecting means is operable to select a different set of motion vectors for use in interpolation of that output image.

Preferably, when an analyzer is employed to detect possible scene changes in the input video signal, the motion compensated interpolator comprises: means for receiving a control signal indicative of the temporal position of an output image to be interpolated with respect to the temporal positions of the corresponding pair of temporally adjacent input images; means responsive to the control signal for setting the relative proportions of the corresponding pair of input images to be used in interpolation of the output image in dependence on the temporal position of the output image when a possible scene change is not indicated; means for setting the relative proportions of the corresponding pair of input images to be used in interpolation of the output image so that the output image depends on the content of a selected one of the pair of input images when a possible scene change is indicated; and interpolation means for generating the output image by combining the corresponding pair of input images according to the relative proportions.

The selected one of the input images could be predetermined, but preferably the selected one of the pair of input images is the input image which is temporally closest to the output image.

Since the set of motion vectors generated at a scene change can be meaningless it is preferred that the motion compensated interpolator comprises means for setting the set of motion vectors to be used in interpolation to a set of zero motion vectors when a possible scene change is indicated.

An alternative to using a modified interpolator is to employ an image store for storing at least one of the corresponding pair of input images from which an output image is to be interpolated; and means responsive to the analyzer indicating a possible scene change for setting the output image to be equal to at least a portion of a stored input image.

In one preferred embodiment the motion vector generator comprises means for performing a predetermined confidence test on each motion vector in a set of motion vectors; and the analyzer comprises means generating a test result dependent upon the proportion of the motion vectors, in a set of motion vectors, which passed the confidence test.

In another preferred embodiment the motion vector generator comprises means for detecting a predetermined number of most commonly occurring motion vectors in a set of motion vectors; and the analyzer comprises means for generating a test result dependent upon the sum of the frequencies of occurrence of the predetermined number of most commonly occurring motion vectors. Both of the two analyzers described above may be employed in a single apparatus, the respective outputs being logically combined.

The invention may be employed in, for example, a television standards converter.

Viewed from a second aspect this invention provides a method of interpolating output images of an output video signal from corresponding pairs of temporally adjacent input images of an input video signal, said method comprising the steps of:

(I) generating, for use in interpolation, sets of motion vectors from pairs of temporally adjacent input images comprising some but not all of said pairs of temporally adjacent input images corresponding to output images;

(II) selecting a set of motion vectors for use in interpolation of a current output image; and (III) interpolating said current output image from a corresponding pair of temporally adjacent input images using said selected set of motion vectors.

The above, and other objects, features and advantages of this invention will be apparent from the following detailed description of illustrative embodiments which is to be read in connection with the accompanying drawings.

BRIEF DESCRIPTION OF THE DRAWINGS

FIG. 10 is a schematic diagram showing the operation of the interpolator in FIGS. 3 or 7;

FIGS. 14 and 15 are schematic diagrams illustrating the operation of the interpolator of FIG. 13;

DESCRIPTION OF THE PREFERRED EMBODIMENTS

Figure 1:
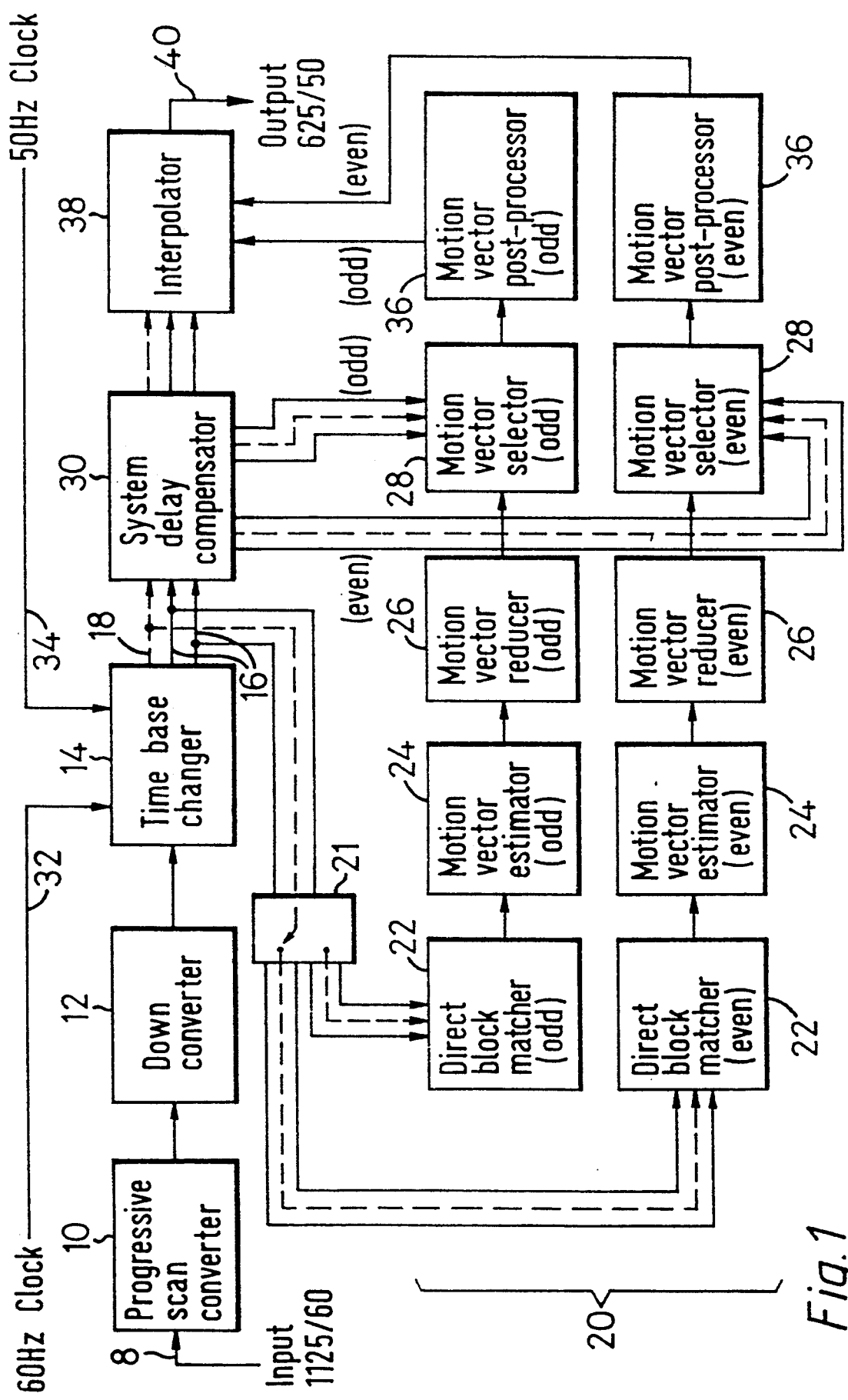
FIG. 1 is a block diagram of a previously proposed motion compensated television standards conversion apparatus.

Referring now to FIG. 1, a block diagram of a previously proposed motion compensated television standards conversion apparatus for converting an input interlaced high definition video signal (HDVS) 8 having 1125 lines per frame and 60 Fields per second into an output interlaced video signal 40 having 625 lines per frame and 50 fields per second is shown. The input video signal 8 is first supplied to a progressive scan converter 10 in which the input video fields are converted into video frames at the same rate (60 Hz) as the input video fields. These frames are then supplied to a down converter 12 which reduces the number of lines in each of the frames to 625, the number of lines in a frame of the output video signal 40. The down-converted input frames are then passed to a time base changer 14 which also receives as inputs a 60 Hz clocking signal 32 locked to the field frequency of the input video signal 8 and a 50 Hz clocking signal 34 locked to the required field frequency of the output video signal 40. The time base changer 14 determines the temporal position of each field of the output video signal and selects two of the down-converted frames of the input video signal 8 to be used in interpolating that field of the output video signal. The two down-converted input frames selected by the time base changer are supplied on respective outputs 16, with a third output 18 of the time base changer carrying control information.

The video signals corresponding to the two down-converted input frames selected by the time base changer 14 are supplied as inputs to a motion processor 20. The motion processor comprises two substantially identical processing sections: one for even output fields and one for odd output fields. The two down-converted input frames selected by the time base changer 14 are routed to the even field or the odd field processing section as appropriate by means of a switch 21 under the control of a signal (not shown) derived from the 50 Hz clocking signal 34.

In the appropriate section (odd or even) of the motion processor 20, the down-converted input frames are supplied first to a direct block matched 22 which calculates correlation surfaces representing the spatial correlation between blocks of the two frames. These correlation surfaces are passed to a motion vector estimator 24 which processes the correlation surfaces to generate a set of motion vectors which are supplied to a motion vector reducer 26. The motion vector estimator also performs a confidence test on each generated motion vector to establish whether that motion vector is significant above the general noise level, and associates a confidence flag with each motion vector indicative of the result of the confidence test. The confidence test itself comprises a 'threshold test' and a 'rings test' and is described, along with other features of the apparatus shown in FIG. 1, in mope detail in the British Published Patent Application number GB-A-2 231 749.

The motion vector reducer 26 operates to reduce the choice of possible motion vectors for each pixel in each block, before the motion vectors are supplied to a motion vector selector 28. As part of its function the motion vector reducer 26 counts the frequencies of occurrence of the 'good' motion vectors (i.e. motion vectors which passed the confidence test), with no account taken of the position of the blocks of the input images used to obtain those motion vectors. The good motion vectors are then ranked in order of decreasing frequency. The three most common of the good motion vectors which are significantly different to one another are then classed as 'global' motion vectors. Three motion vectors which passed the confidence test are then selected for each block and are supplied, with the zero motion vector, to the motion vector selector 28 for further processing. These three selected motion vectors are selected in a predetermined order of preference from the motion vector generated from that block, those generated from the surrounding blocks, and finally the global motion vectors.

The motion vector selector 28 also receives as inputs the two down-converted input frames selected by the time base changer 14 and which were used to calculate the motion vectors (suitably delayed by a system delay compensator 30) and supplies an output comprising one motion vector per pixel of the output field. This motion vector is selected from the four motion vectors for that block supplied by the motion vector reducer 26. Any irregularity in the selection of the motion vectors by the motion vector selector 28 is removed by a motion vector post processor 36, from which the processed motion vectors are supplied to and control an interpolator 38 which also receives the appropriate odd or even pair of down-converted input frames selected by the time base changer, again suitably delayed by the system delay compensator 30. Using the motion vectors, the interpolator 38 interpolates an output field from the two down-converted input frames selected by the time base changer, taking into account any image motion between the two frames. The two down-converted input frames are combined in relative proportions depending on the temporal position of the output field with respect to the two frames, so that a larger proportion of the nearer input image is used. The output 40 of the interpolator 38 is an interlaced video signal having 625 lines per frame and 50 fields per second.

Figure 2:
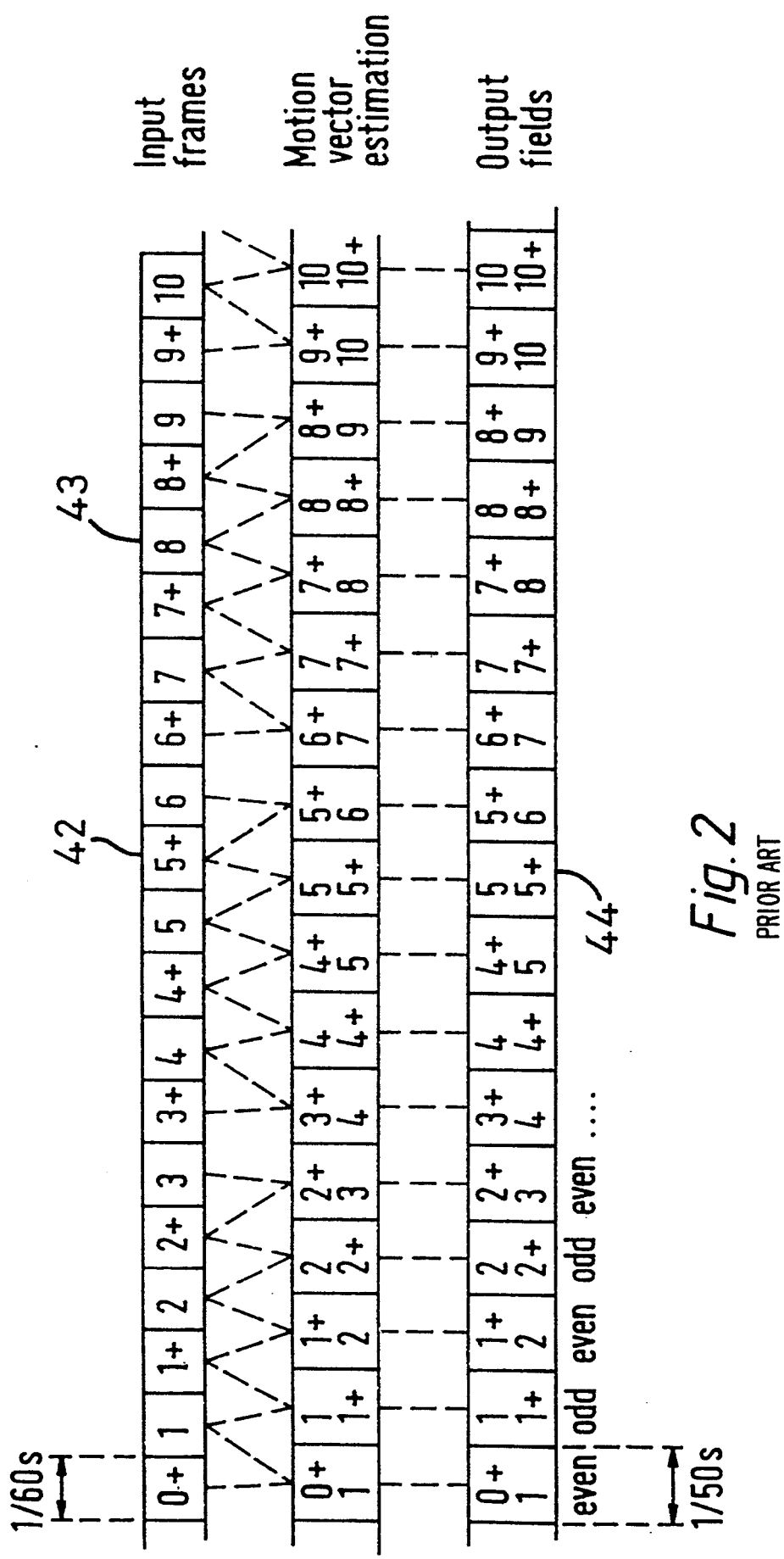
FIG. 2 is a schematic diagram showing the operation of the apparatus of FIG. 1.

FIG. 2 illustrates the way in which pairs of temporally adjacent down-converted frames of the input video signal 8 are selected by the time base changer 14 for use in interpolating a corresponding odd or even field of the output video signal 40. The upper row in FIG. 2 represents the down-converted frames of the input video signal 8. As mentioned above, the input video signal has a field rate of 60 Hz and the output of the progressive scan converter 10 is a series of video frames at the same frequency as the field frequency of the input video signal. In order to clarify FIG. 2 and so that the downconverted input frames used to interpolate each output field can be identified, each of the down-converted input frames is denoted by a number relating to the corresponding input field. For example, a downconverted input frame 42 is denoted by the number 5+, showing that it originated from an odd field in a fifth frame of the input video signal 8 (before progressive scan conversion). Similarly another downconverted input frame 43 is denoted by the number 8, indicating that it originated from an even field in the 8th frame of the input video signal.

The output video signal has a field frequency of 50 Hz, so the temporal separation of adjacent Fields in the output video signal is greater than the temporal separation of adjacent down-converted input frames in the input video signal. The time base changer 14 is operable to select the two down-converted input frames closest to the temporal position of an output field to be used in interpolating that output field. For example an (even) output field 44 is interpolated from the two down-converted input frames temporally closest to that output field (those denoted by the numbers 5 and 5+) using motion vectors representing image motion between the same two frames (i.e. those denoted by the numbers 5 and 5+).

Figure 3:
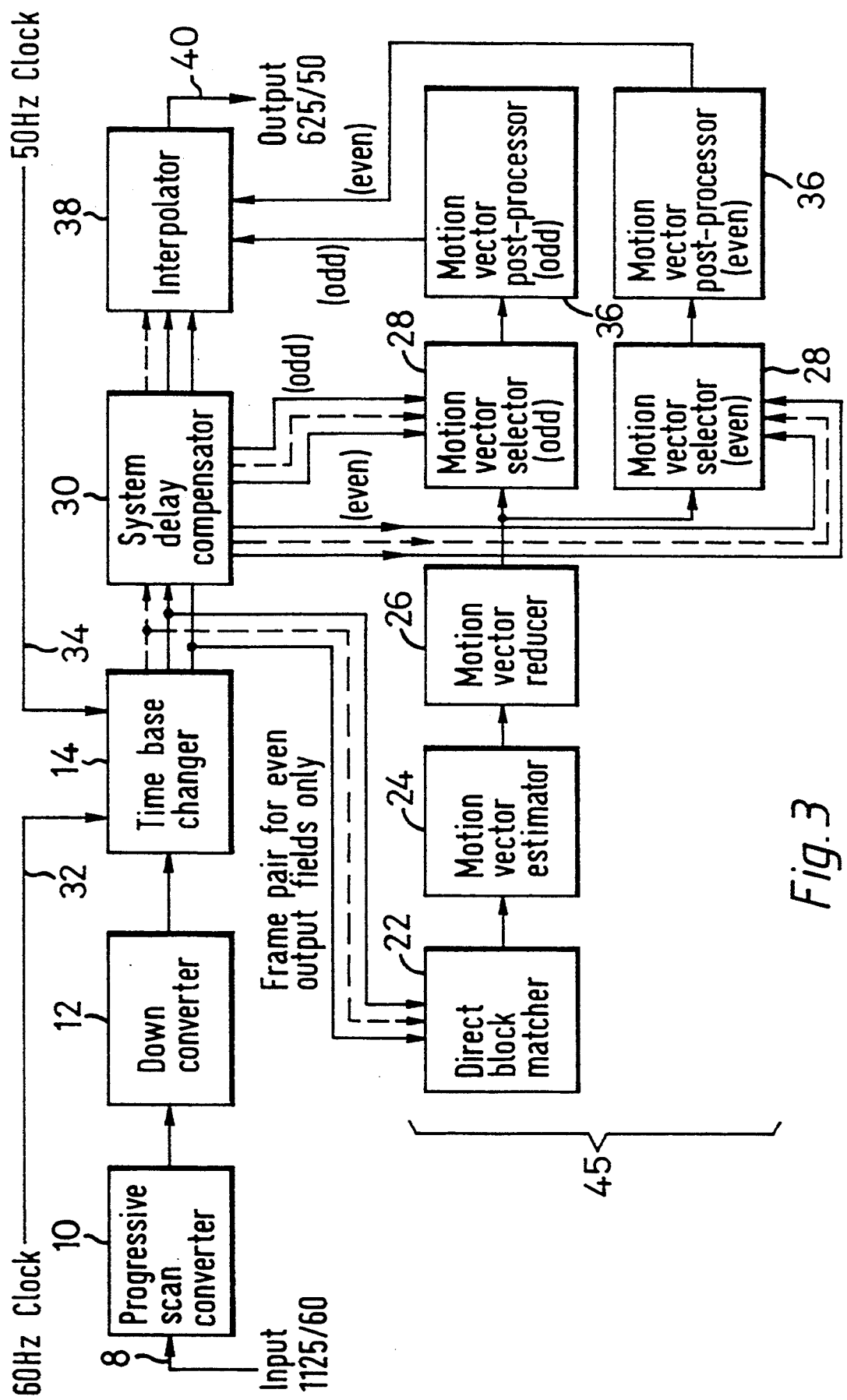
FIG. 3 shows a television standards conversion apparatus according to a first embodiment of the invention.

FIG. 3 shows a television standards conversion apparatus according to one embodiment of the present invention. The apparatus is similar to that shown in FIG. 1 but includes a modified motion processor 45.

The motion processor 45 in FIG. 3 comprises a single direct block marcher 22, a single motion vector estimator 24 and a single motion vector reducer 26. The direct block matcher 22 receives only those pairs of down-converted input frames selected by the time base changer 14 for the interpolation of even output fields. The direct block matcher 22, the motion vector estimator 24 and the motion vector reducer 26 generate a set of motion vectors from the two (even) downconverted input frames selected by the time base changer and supply the motion vectors to an odd field motion vector selector and to an even field motion vector selector.

The even field motion vector selector also receives the down-converted input frame pair from which the even field is to be interpolated, suitably delayed by the system delay compensator 30 and, in conjunction with an even field motion vector post processor, supplies one motion vector per pixel for use by the interpolator in interpolating the even output field from the two down-converted input frames selected by the time base changer for that field.

The odd field motion vector selector receives the set of motion vectors generated from the even field down converted input frame pair and also receives the frame pair from which the odd field is to be interpolated, suitably delayed by the system delay compensator 30. In conjunction with an odd field motion vector post processor it supplies one motion vector per pixel for use by the interpolator in interpolating the odd output field from the two down-converted input frames selected by the time base changer For that odd field. The apparatus is arranged so that, of the two output fields (one even and one odd) interpolated using the single set of motion vectors, the odd output field follows the even output field.

By using the same set of motion vectors for adjacent even and odd output fields the size of the apparatus has been reduced by one direct block marcher 22, one motion vector estimator 24 and one motion vector reducer 26.

Figure 4:
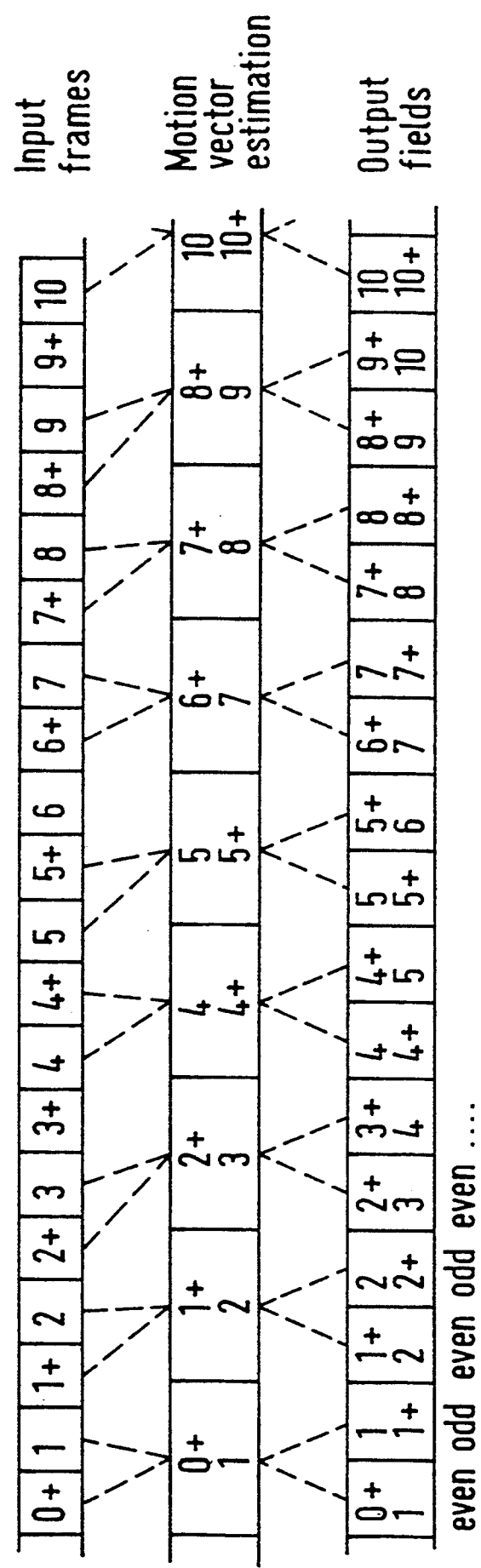
FIG. 4 is a schematic diagram showing the operation of the apparatus of FIG. 3, in which odd output fields are interpolated using sets of motion vectors generated from the preceding even output field.

FIG. 4 is a schematic diagram illustrating the operation of the apparatus shown in FIG. 3, in which sets of motion vectors are generated for alternate ones of the output fields (the even output fields). These motion vectors are used in the interpolation of the even output fields and are then re-used for the next following odd output field. Each of the odd output fields is therefore interpolated between the two down-converted input frames closest to that odd field as described above, but the interpolation is performed using a set of motion vectors generated from the two down-converted input frames nearest to the preceding even output field.

Figure 5:
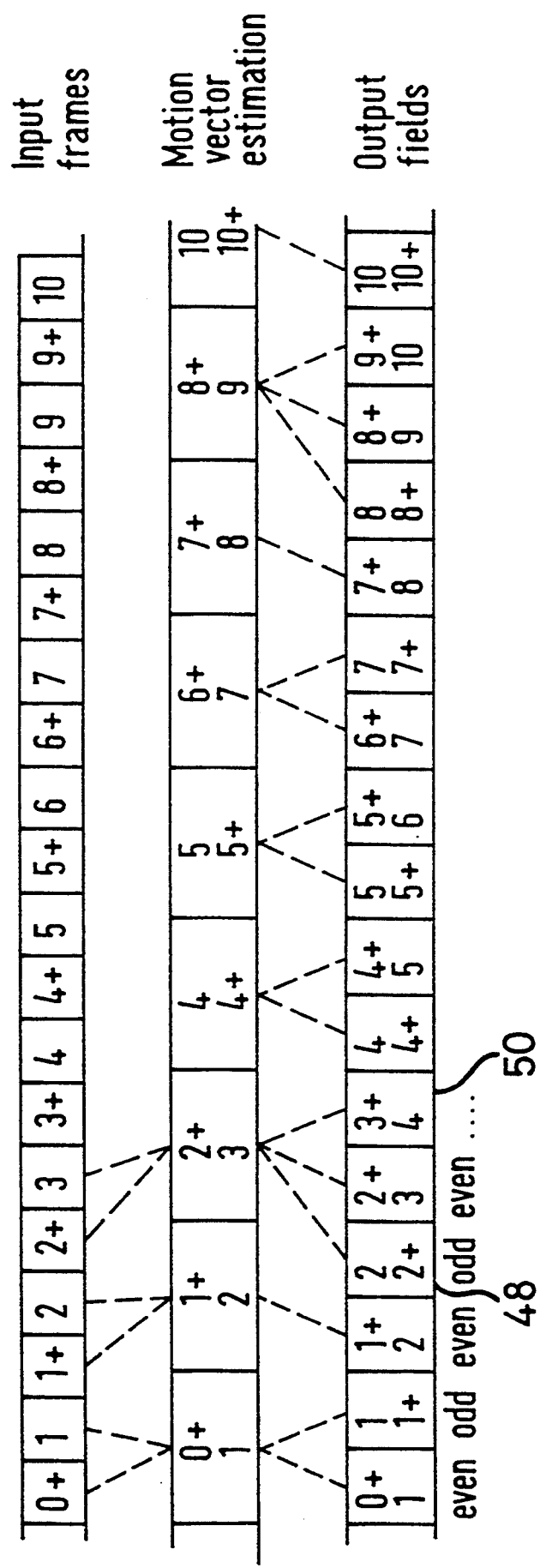
FIG. 5 is a schematic diagram showing the interpolation of odd output fields using sets of motion vectors generated from an adjacent even output field.

FIG. 5 shows a second way in which sets of motion vectors can be generated from the pairs of down-converted input frames selected for use in interpolating the even output fields and then also used for interpolating odd output fields. However, rather than simply re-using the set of motion vectors relating to the immediately preceding even output field for interpolation of an odd output field, a set of motion vectors is selected for which the pair of down-converted input frames used to generate that set is nearest to the temporal position of the odd output field.

Figure 6:
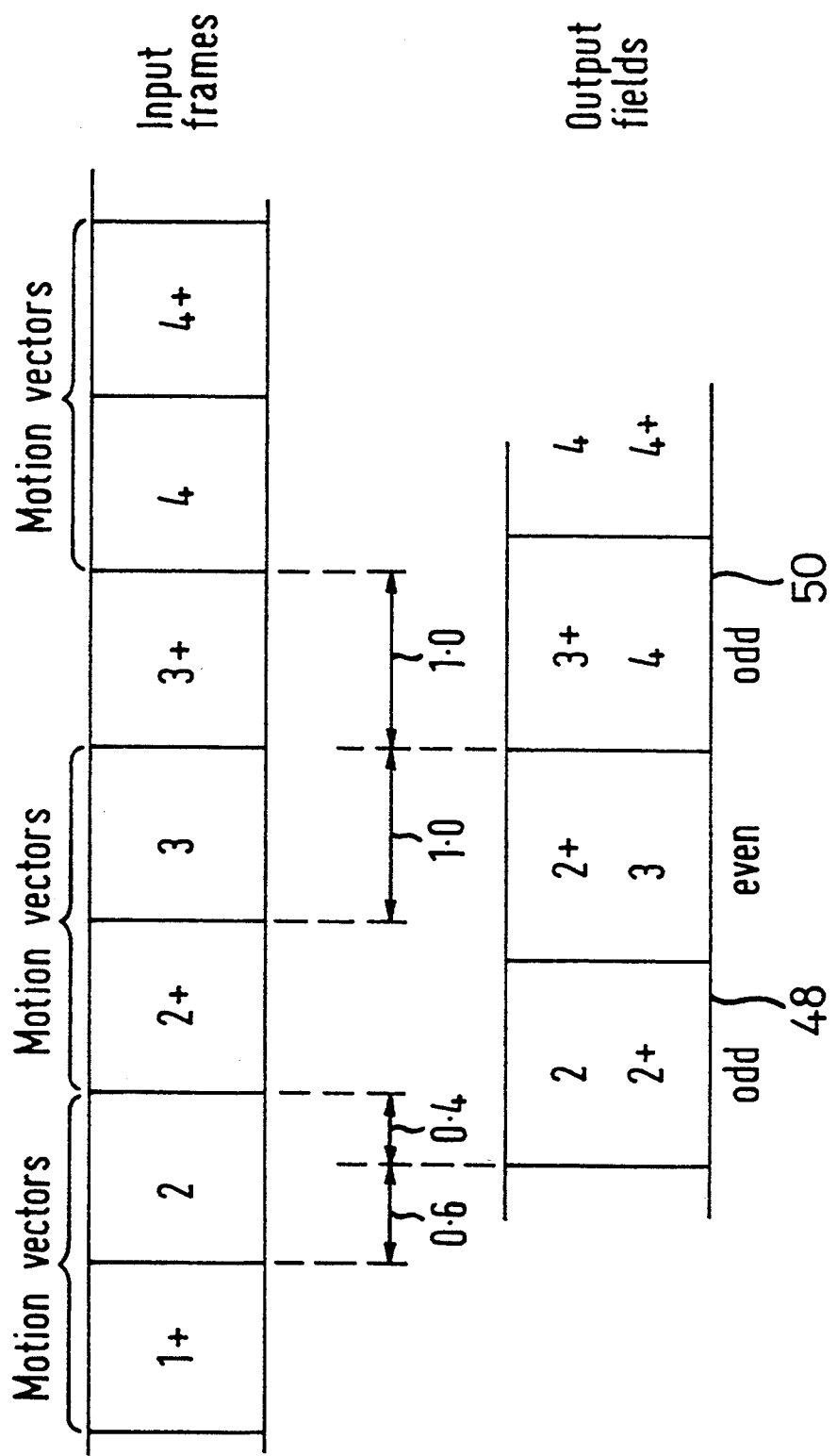
FIG. 6 is an enlarged view of a portion of FIG. 5.

For example, for an odd output field 48 in FIG. 5, the temporal position of the output field 48 is nearer to the down-converted input frame pair denoted by 2+, 3 from which the next following even field is interpolated than it is to the frame pair denoted by 1+, 2 from which the immediately preceding even output field was interpolated. This temporal relationship is shown in more detail in FIG. 6 which is an expanded version of a part of FIG. 5. In FIG. 6 the down-converted input frames denoted by the numbers 1+, 2, 2+, 3, 3+, 4 and 4+ are shown. As in FIG. 5, sets of motion vectors are generated from the following frame pairs: 1+and 2; 2+and 3; 4 and 4+. In order to decide which set of motion vectors to use in interpolating the odd output field 48 the starting time of the field period of the output field 48 is compared with the starting time of the two nearest down-converted input frames used to generate sets of motion vectors, namely frames 2 and 2+. Assuming that in FIG. 5 the start of the down-converted input frame 0+ was coincident with the start of the first (even) output field, the start of the output field 48 is displaced from the start of the down-converted input frame 2 by 0.6× (the input Frame period (1/60 second)) and from the start of the down-converted input Frame 2+ by 0.4× (the input frame period). The smaller of these two displacements is selected, so that the output field 48 is interpolated using the set of motion vectors generated from a frame pair including the frame 2', that is, the frame pair 2+, 3. Accordingly, the motion vectors generated from the frame pair 2+, 3, which are used in interpolating the even output field immediately following the odd output field 48, are also used in interpolating the odd output field 48.

A second example shown in FIG. 6 is that of the selection of a set of motion vectors for use in interpolating sun odd output field 50. As shown, the temporal position of the start of the odd output field 50 is equidistant between the start of the down-converted input frame 3 and the start of the down-converted input frame 4 (the frame 3+ is not used to generate a set of motion vectors and so is disregarded in this comparison). It is necessary to employ a convention to decide cases such as this, so by convention the set of motion vectors generated for use in interpolating the next preceding even output field is selected (that is, the set of motion vectors generated from the frame pair 2+, 3).

One advantage of the selection method illustrated in FIGS. 5 and 6 is that because the temporally nearest of the available sets of motion vectors is used, the image motion at the time the motion vectors are calculated is likely to be very similar to that at the time of the odd output field, so tending to reduce any errors which might be caused by the re-use of the sets of motion vectors.

Figure 7:
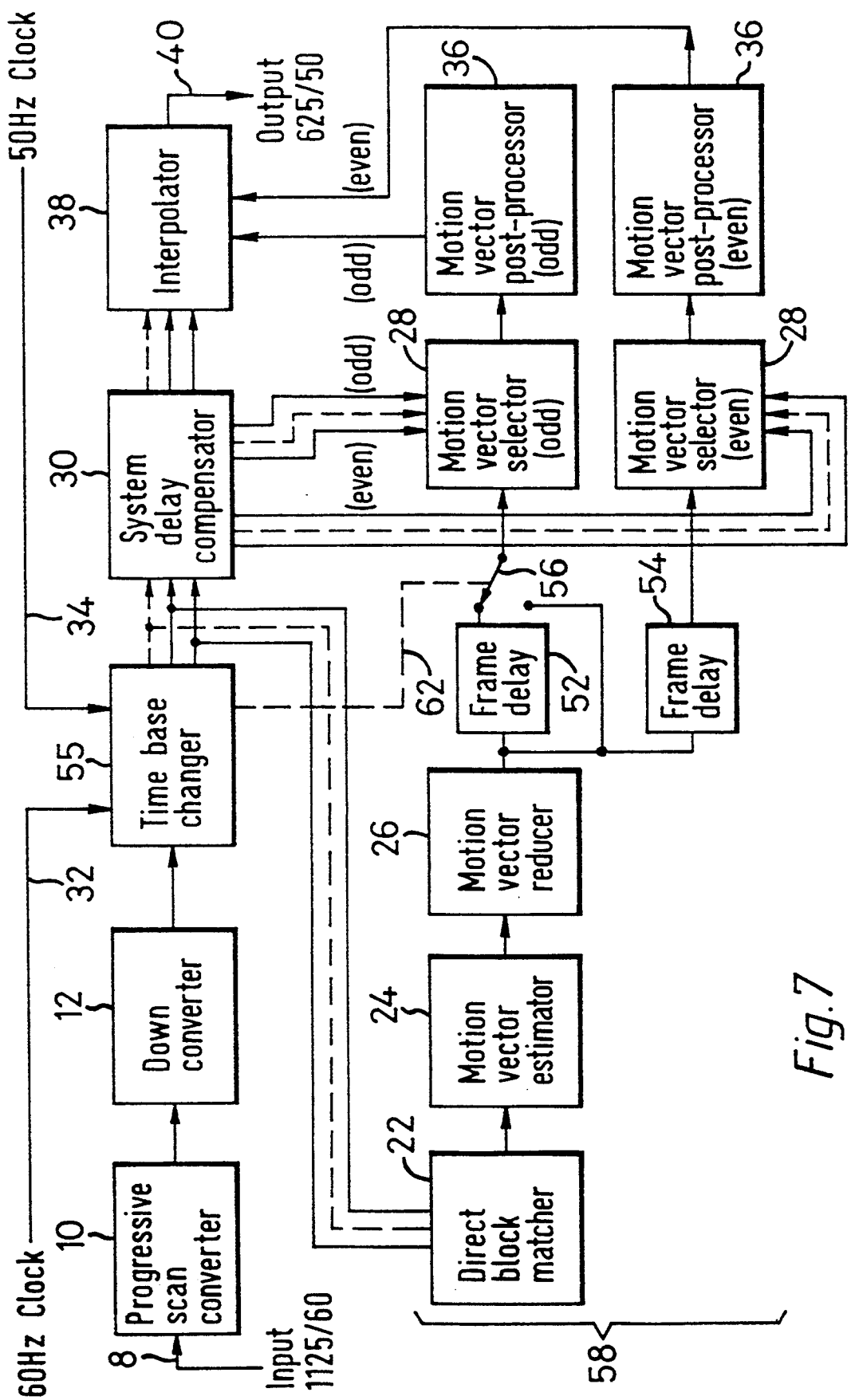
FIG. 7 shows a television standards conversion apparatus for operating in the manner illustrated in FIGS. 5 and 6.

FIG. 7 shows a television standards conversion apparatus according to another embodiment of the invention, for performing the selection of the set of motion vectors to be used in interpolating an odd output field as shown in FIGS. 5 and 6. The apparatus is similar to that shown in FIG. 3, the main difference being the addition of a switchable delay unit 52 and a fixed delay unit 54 in a modified motion processor 58. The fixed delay unit 54 is interposed between the motion vector reducer 26 and the input of the motion vector selector 28 in the even output field section of the motion processor, and provides a time delay of one frame period (two field periods) of the output video signal to the set of motion vectors output by the motion vector reducer 26.

The switchable delay unit 52 is interposed between the output of the motion vector reducer 26 and the input of the motion vector selector 28 in the odd output field section of the motion processor, and, as fop the fixed delay unit 54 above, provides a time delay of one frame period (two field periods) of the output video signal to the set of motion vectors output by the motion vector reducer 26. The input to the odd field motion vector selector is controlled by a switch 56 so that either the (undelayed) set of motion vectors at the input of the delay unit 52 or the (delayed) set of motion vectors at the output of the delay unit 52 is supplied to the odd field motion vector selector.

The switch 56 operates under the control of a control signal 62 derived by the time base changer 52. The derivation of the control signal 62 will be described further below.

When the switch 56 selects the delayed output of the delay unit 52 an equal delay is applied to the set of motion vectors passed to the odd field motion vector selector and the set passed to the even field motion vector selector. With the switch 56 in this position, apart from this additional common delay, which is compensated for by an additional one output frame (two output fields) delay in the system delay compensator 30, the apparatus operates in the same way as that shown in FIG. 3 above, in that the motion vectors processed by the odd field motion vector selector and the odd field motion vector post processor (and subsequently used for interpolation of an odd field by the interpolator 38) are those generated from a pair of down-converted input frames corresponding to the even output field immediately preceding that odd field.

The situation is different when the switch 56 selects the (undelayed) input of the delay unit 52. In this case the delay applied to the set of motion vectors passed to the odd field motion vector selector is less (by one output frame period) than that applied to the set passed to the even field motion vector selector. This means that the motion vectors processed by the odd field motion vector selector and the odd field motion vector post processor (and subsequently used for interpolation of an odd field by the interpolator 38) are those generated from a pair of down-converted input frames corresponding to the even output field immediately following that odd field.

It is therefore possible to select whether an odd output field is interpolated using motion vectors from the preceding even output field or from the following even output field simply by selecting the appropriate position of the switch 56.

The delay could be implemented as an actual delay line or could simply be a storage buffer for temporarily storing a set of motion vectors.

As mentioned above, the position of the switch 56 is controlled by a control signal 62. The way in which the control signal 62 is derived by the time base changer 55 will now be described with reference to FIGS. 9 and 10.

Figure 8:
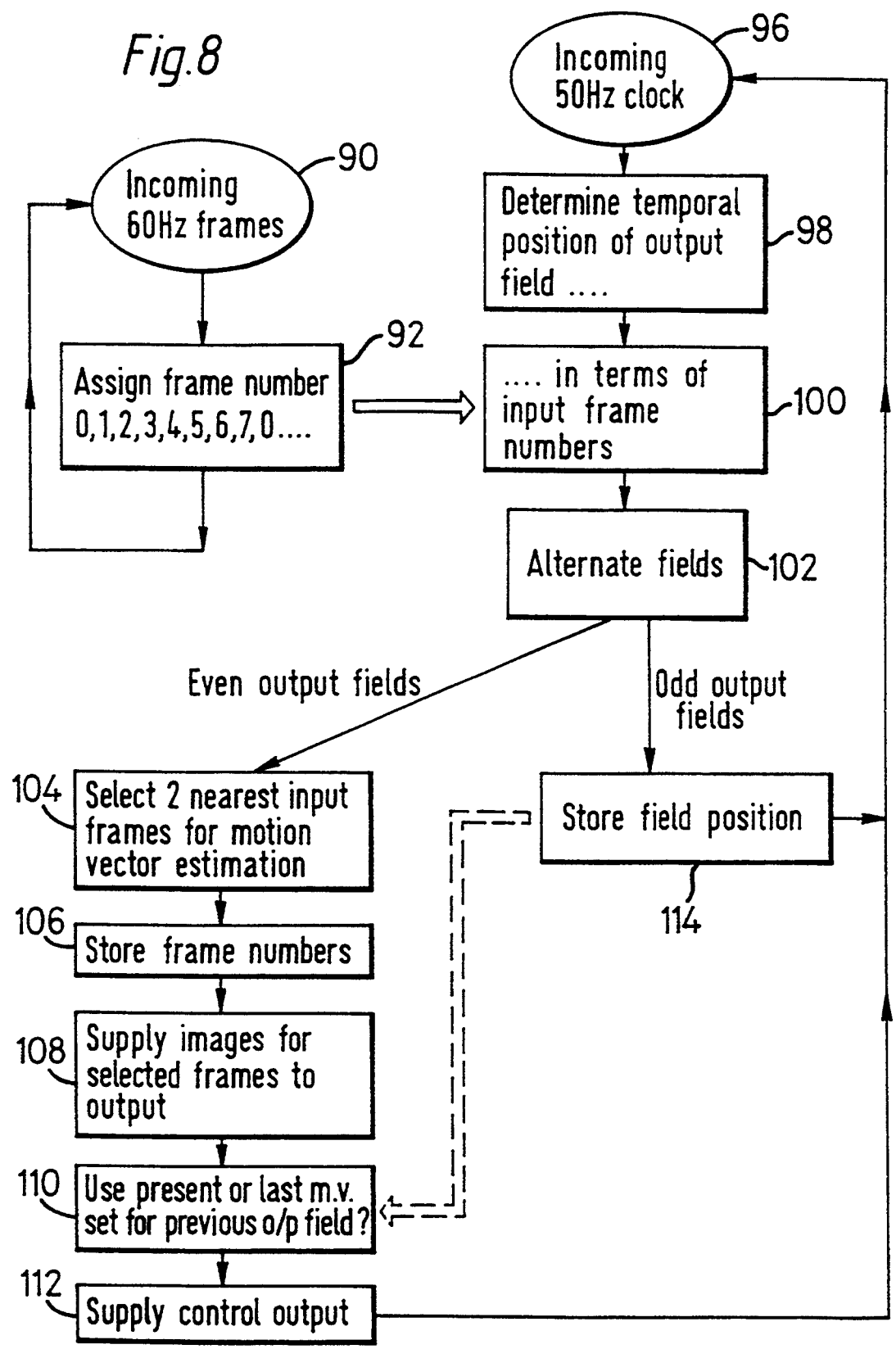
FIG. 8 is a flow chart showing operation of the time base changer in FIG. 7.
Figure 9:
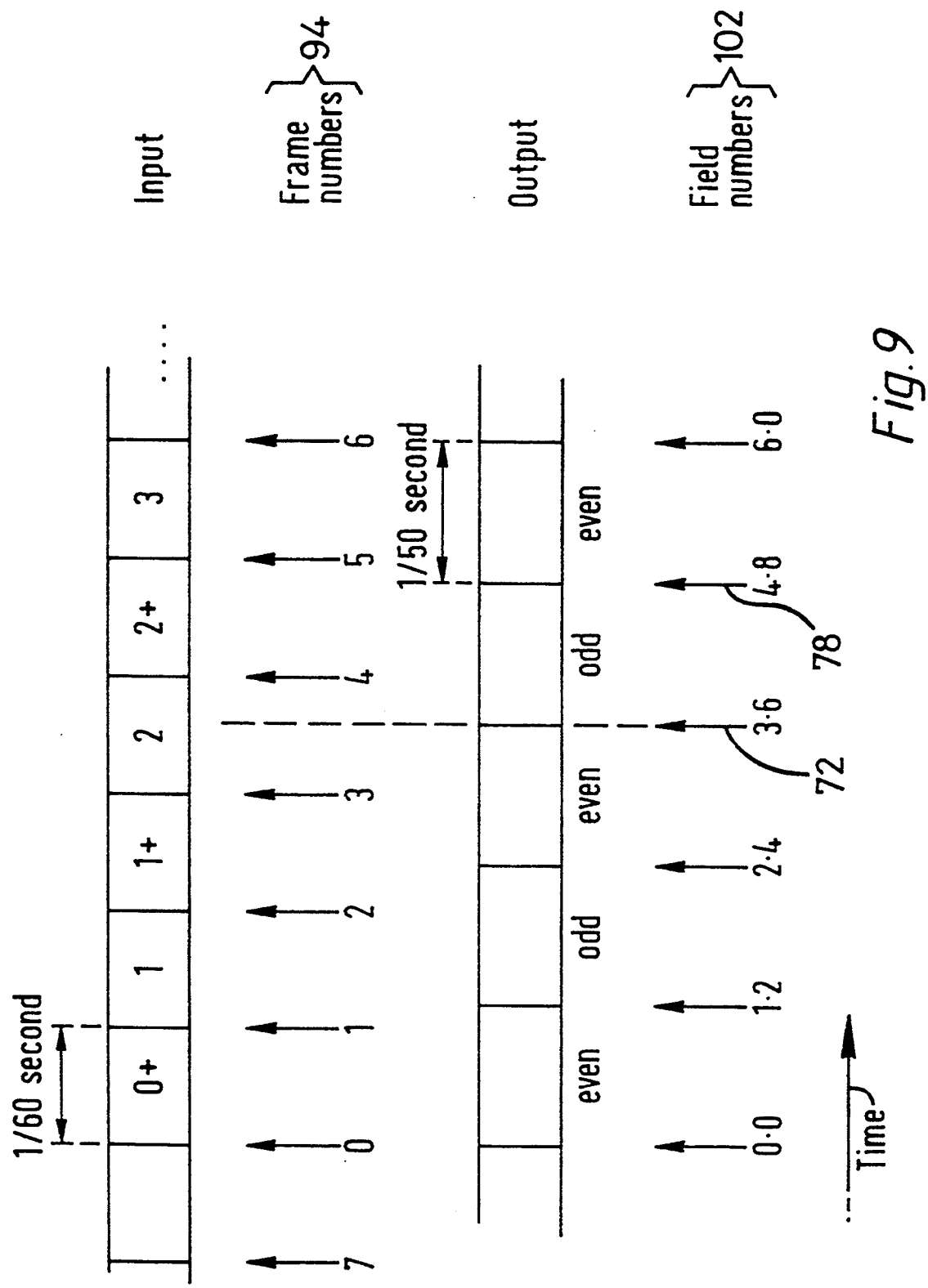
FIG. 9 is a schematic diagram illustrating the effects of some of the operational steps in FIG. 8.

FIG. 8 is a flow chart showing a part of the operation of the time base changer 55 in FIG. 7. The operations performed by the time base changer 55 and shown in FIG. 8 can be categorised into two separate loops of operations shown on the left hand side and the right hand side of FIG. 8 respectively. FIG. 9 is a schematic diagram showing the effect of some of the steps shown in FIG. 8.

Referring to the operations shown on the left hand side of FIG. 8, as each down-converted input frame is passed to the time base changer at a step 90 it is assigned a frame or index number representing the temporal position of the start of that frame, at a step 92. The frame numbers follow a cyclic sequence 0, 1, 2, 3, 5, 6, 7, 0, 1, 2 . . . The sequence need only be long enough that ambiguities do not arise in the subsequent processing described below. A row of frame numbers (row 94) is shown in FIG. 9.

The frame numbers 0, 1, 2, 3 . . . assigned at the step 92 and shown as the row 94 in FIG. 9 are used for internal processing within the time base changer. They are distinct from the frame numbers 0+, 1, 1+, 2 . . . used first in FIG. 2 above to clarify the origin of each down-converted input frame.

Referring to the steps shown on the right hand side of FIG. 8, as each clock pulse of the 50 Hz clocking signal 34 is received by the time base changer 55 at a step 96, the temporal position of the start of an output field corresponding to the clock pulse is determined at a step 98. This temporal position is then calculated in terms of the frame numbers assigned to the down-converted input frames at the step 92, at a step 100. The result of the operations carried out in the step 100 is illustrated in FIG. 9 as a row of output field numbers 102. For example, an output field 72 in FIG. 9 is six tenths of the way between the down-converted input frames which have been assigned frame numbers 3 and 4 and so has an output field number of 3.6.

At a step 102 the operation of the time base changer 55 divides to follow two different paths for alternate output fields. For even output fields the operation will follow a path including the steps 104, 106, 108, 110 and 112, while for odd output fields operation will be passed to a step 114.

Considering the operations for odd fields, a single step 114 is performed in which the field number (e.g. 3.6) for the current (odd) output field is stored in a temporary storage buffer, for use during processing of the next (even) output field.

In the case of an even field, at a step 104 the two down-converted input frames nearest to the output field are selected to be used for motion vector generation. The way in which these two frames are selected is simple, in that the input frame numbers immediately above and below the current (even) output field number are selected. For example, if the output field number is 4.8 (the output field 78 in FIG. 9) the pair of frames selected for motion vector estimation will be those having a frame number immediately above or below 4.8, namely the frames numbers 4 and 5. In order to resolve any possible ambiguities, it is again necessary to employ a convention so that an integral output field number is taken by convention to be nearer to the frame number below the output field number than to the input frame number above the output field number. For example, the input frames used to generate a set of motion vectors corresponding to the output field number 0.0 (the leftmost output field in FIG. 9) are those numbered 0 and 1 rather than those numbered 7 and 0.

After the input frames for motion vector estimation have been selected at the step 104, their frame numbers are stored at the step 106 and the video signal corresponding to those frames is supplied at the output 16 of the time base changer 55 to be passed to the direct block matcher 22.

At a step 110 a determination is made as to whether the present set of motion vectors or the immediately preceding set of motion vectors should be used for the preceding odd output field (for which field a set of motion vectors would not have been calculated). This determination is made by referring to the field number of the preceding odd output field stored in the temporary storage buffer and to the frame numbers of the frames selected for the calculation of the present and previous sets of motion vectors (the frame numbers of which were stored at the step 106). For example when the motion vectors corresponding to the output field number 4.8 are being calculated, a determination is made at the step 110 of whether the present set of motion vectors (calculated from the input frames numbers 4 and 5 in the row 94) or the previous set of motion vectors (calculated from the input frames numbers 2 and 3 in row 94) should be used for interpolating the preceding odd output field number 3.6. Since 3.6 is closer to 4 than it is to 3, the selected set of motion vectors will be those generated from the input frames numbers 4 and 5. This is the set of motion vectors corresponding to the even field following that odd field, so at the step 112 the control signal 62 is set to control the switch 56 to select the (undelayed) input of the switchable delay unit 52 in FIG. 7.

After the step 112 (for even fields) or the step 114 (for odd fields), control is passed back to the step 96 where another 50 Hz clock pulse is received.

FIG. 10 is a schematic illustration showing the operation of the interpolator 38, in which an (odd or even) output field 150 is interpolated from a corresponding pair of input frames (a preceding input frame 152 and a following input frame 154). As mentioned above, each pixel 156 in the output field 150 has associated with it a motion vector 158, selected by the motion vector selector 28. The motion vector 158 may have been generated from the preceding input frame 152 and the following input frame 154 (in the case of an even output field) or, in the case of an odd output field, from a pair of down-converted input frames corresponding to a temporally adjacent even output field. The motion vector is used by the interpolator 38 to select a portion 160 of the preceding input frame 152 and a portion 162 of the following input frame 154 to be used in deriving the pixel 156 in the output field 150. The position of the portion 160 in the preceding input frame 152 is displaced from the position of the pixel 156 in the output field 150 by an amount dependent upon the motion vector 158 and the temporal displacement of the output field 150 from the preceding input frame 152. Similarly the position of the portion 162 in the following input frame 154 depends upon the motion vector 158 and the temporal displacement of the output field 150 from the following input frame 154. A filtering process is used so that the portions 160 and 162 on which the pixel 156 depends comprises a group of pixels in the respective input frame 152, 154.

The interpolation process described above relies on the assumption that the portion 160, the pixel 156, and the portion 162 all relate to the same part of an image, even though that part has moved between the preceding input frame 152 and the following input frame 154. This assumption can fail for two reasons when a scene change or another dynamic video effect occurs between the preceding input frame 152 and the following input frame 154.

One reason that the motion compensated interpolation process shown in FIG. 10 may fall down at a scene change is that the scene change itself may appear to the motion vector estimator as a large amount of rapid image motion, leading to the generation of spurious and potentially large motion vectors. This will result in errors in the calculation of the respective positions of the portion 160 and the portion 162. Furthermore, whatever the positions of the portions 160 and 162 are calculated to be, the actual image content of the portion 160 may be completely unrelated to that of the portion 162, so an interpolation between the portion 160 and the portion 162 will be meaningless.

Two different analyzers for use with the apparatus of FIGS. 3 or 7 and which are capable of detecting a possible scene change in the input video signal will now be described with reference to FIGS. 11 and 12. Suitable modifications to the apparatus shown in FIGS. 3 or 7, so that the output image is derived by intra-frame processing (rather than inter-frame processing) when a possible scene change is detected will then be described with reference to FIGS. 13 to 17.

Figure 11:
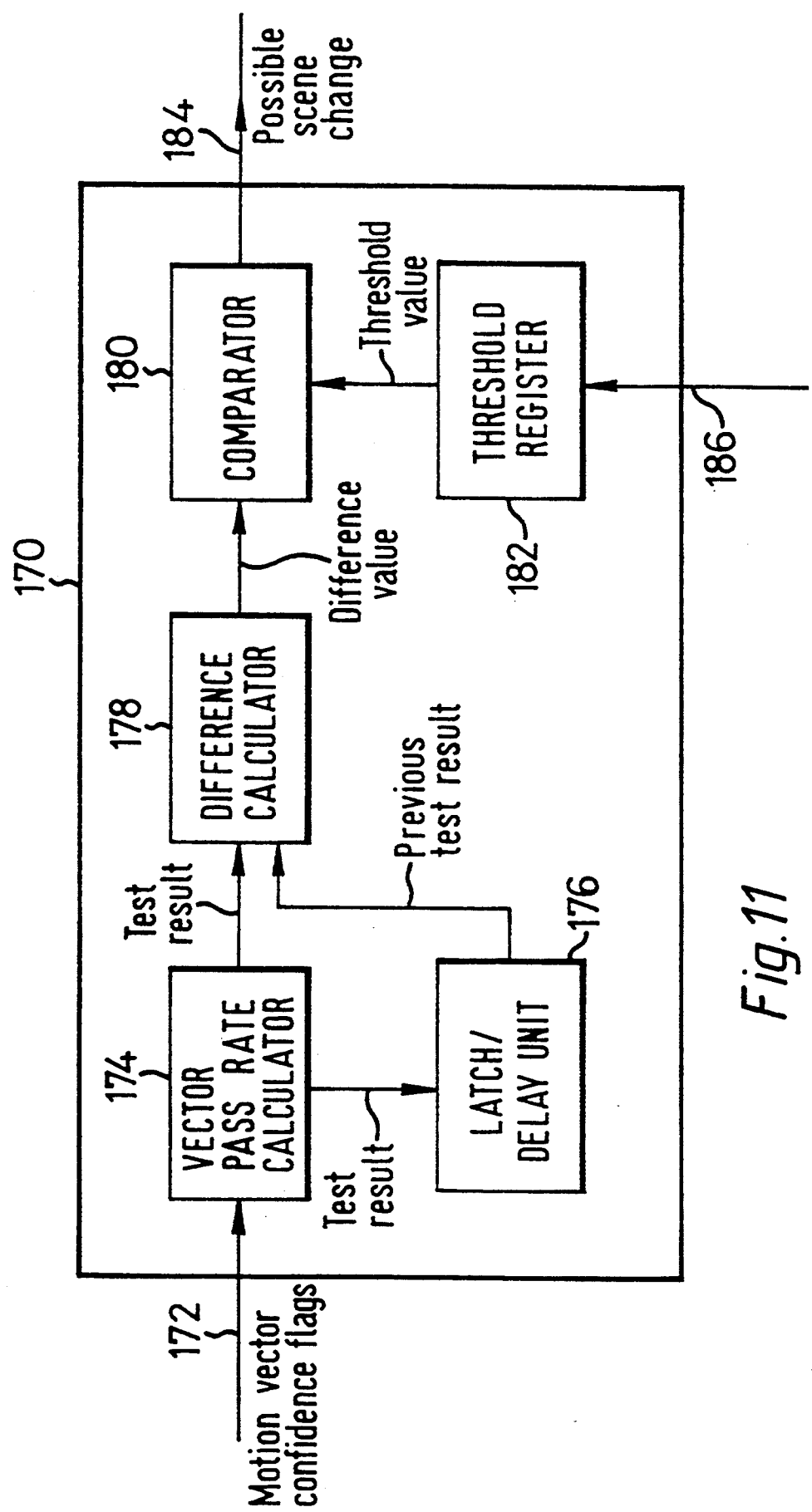
FIG. 11 shows one embodiment of an analyzer for detecting possible scene changes in an input video signal.

FIG. 11 is a schematic diagram of an analyzer 170 for detecting a scene change between adjacent input frames of the input video signal. The analyzer 170 performs a predetermined test for each set of motion vectors to obtain a respective test result indicative of the degree of correlation between the pair of input images used to derive that set of motion vectors and detects a change of at least a predetermined size in the test results obtained for successive sets of motion vectors, thereby indicating a possible scene change in the input video signal.

The predetermined test performed by the analyzer of FIG. 11 is to analyze the confidence flags generated by the motion vector estimator 24 and associated with each of the motion vectors in a set of motion vectors. These motion vector confidence flags are received on an input 172 and are passed to a vector pass rate calculator 174. The vector pass rate calculator 174 calculates the number of motion vectors in the set of motion vectors which passed the confidence test, as a proportion of the total number of motion vectors in that set. A test result calculated by the vector pass rate calculator 174 is supplied to a difference calculator 178 and to a latch/delay unit 176 where the test result is temporarily stored.

The difference calculator 178 receives the test result calculated by the vector pass rate calculator 174 corresponding to the set of motion vector confidence flags currently at the input 172 of the analyzer 170, along with the test result stored in the latch/delay unit 176 corresponding to the previous set of motion vector confidence flags supplied to the analyzer 170. The difference calculator 178 calculates the numerical difference between the test result received from the vector pass rate calculator 174 and the previous test result received from the latch/delay unit 176, passing a difference value to a comparator 180.

The comparator 180 compares the difference value supplied to it by the difference calculator 178 with a threshold value stored in a threshold register 182. If the comparator 180 detects a drop in the test results (the proportion of motion vectors in a set which passed the confidence test) corresponding to two successive sets of motion vectors, it supplies an output 184 indicating that there has been a possible scene change in the input video signal.

The output 184 indicates a possible, rather than a definite, scene change for the following reasons. If a scene change occurred in which there was a high degree of correlation between the input images before and after the scene change, enabling successive sets of motion vectors to be generated for which a large proportion passed the confidence test, then it is likely that the interpolator 38 would continue to operate satisfactorily in spite of the scene change. In this case the output 184 would not indicate a possible scene change, but this failure to detect the scene change would not have a detrimental effect on the operation of the interpolator 38. Conversely, if a scene change did not actually occur but the nature of the input video signal was such that the test result calculated by the vector pass rate calculator 174 (reflecting the degree of correlation between the pair of input image used to generate a set of motion vectors) dropped by more than the threshold value between successive sets of motion vectors, then it is likely that the operation of the interpolator 38 would be detrimentally affected even though, strictly speaking, there had not been a scene change in the input video signal. Such an occurrence would be indicated as a possible scene change on the output 184 and appropriate action could be taken.

It may be necessary to apply a delay to the output 184 from the analyzer, in order that the output indicating whether or not a possible scene change has been detected between two input frames is relevant to the pair of input frames currently being supplied to the interpolator from the system delay compensator.

The threshold value stored in the threshold register 182 may be changed, automatically or by an operator, using an input 186 to the analyzer 170. Such changes may be made necessary by the nature of a particular input video signal, in order to tune the detection of possible scene changes performed by the analyzer to that input video signal.

Figure 12:
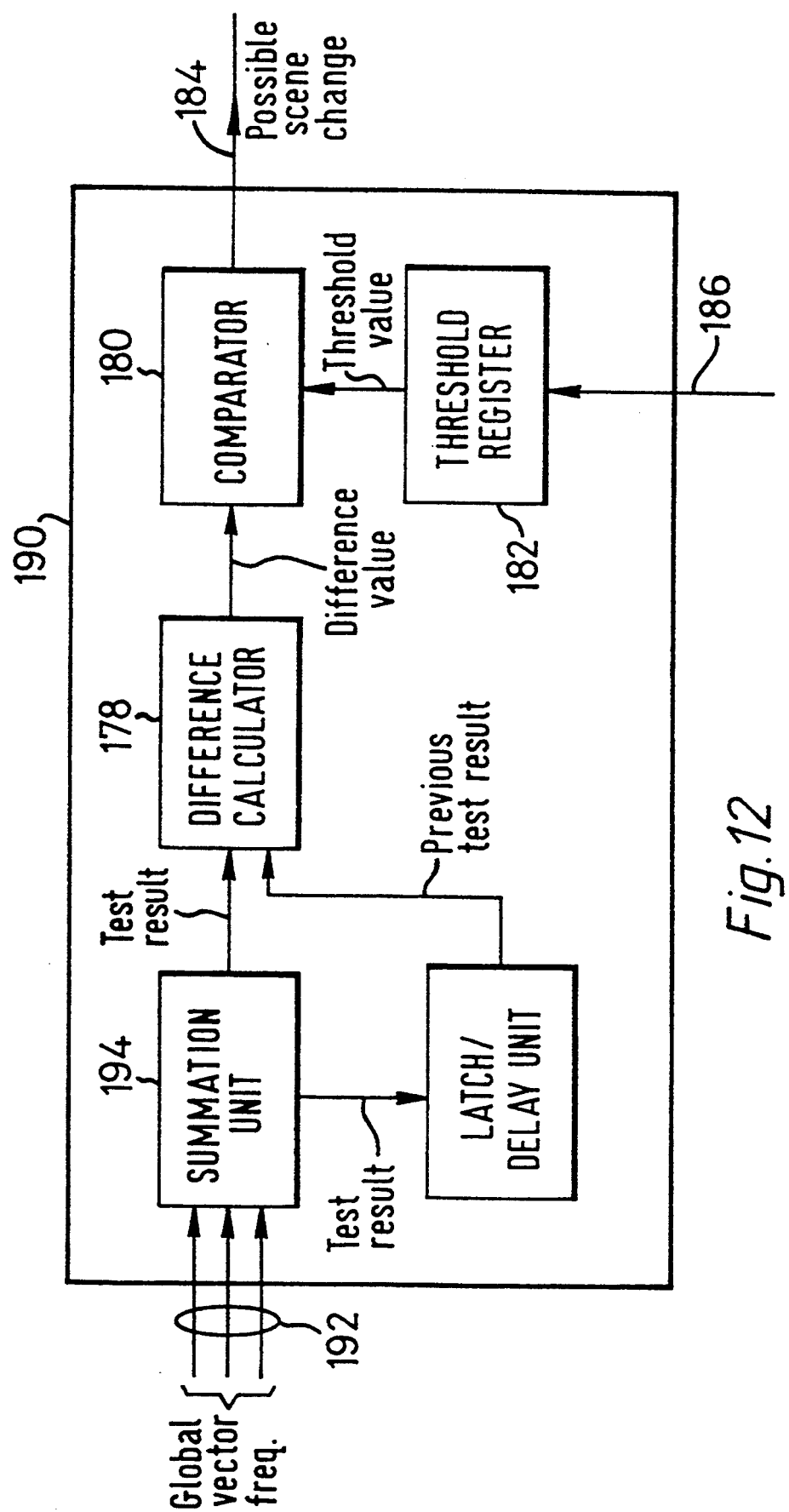
FIG. 12 shows another embodiment of an analyzer for detecting possible scene changes in an input video signal.

FIG. 12 is a schematic illustration of a second embodiment of an analyzer 190 which operates in a similar manner to the analyzer 170 described above to produce an output 184 indicating a possible scene change in an input video signal. The analyzer 190 receives a set of inputs 192 representing the frequencies of occurrence of the three global motion vectors selected by the motion vector reducer 26. For each set of motion vectors a summation unit 194 sums the global vector occurrence frequencies received on the inputs 192, passing this sum as a test result to a difference calculator 178 and to a latch/delay unit 176, both of which are similar to those described above with reference to FIG. 11.

The difference calculator calculates the numerical difference between the test result received from the summation unit 194 representing the sum of the global vector occurrence frequencies for a current set of motion vectors and a previous test result received from the latch/delay unit 176 representing that sum for the immediately preceding set of motion vectors. The difference calculator supplies a difference value to a comparator 180 in which the difference value is compared with a threshold value stored in a threshold register 182. If a drop of more than the threshold is detected in the test results corresponding to two successive sets of motion vectors, the output 184 of the analyzer 190 indicates a possible scene change in the input video signal. As above, the threshold value may be varied by means of an input 186 to the threshold register 182.

A combination strategy for detecting possible scene changes could be used in which the outputs 184 from an analyzer 170 and an analyzer 190 are combined using a logical OR gate.

Figure 13:
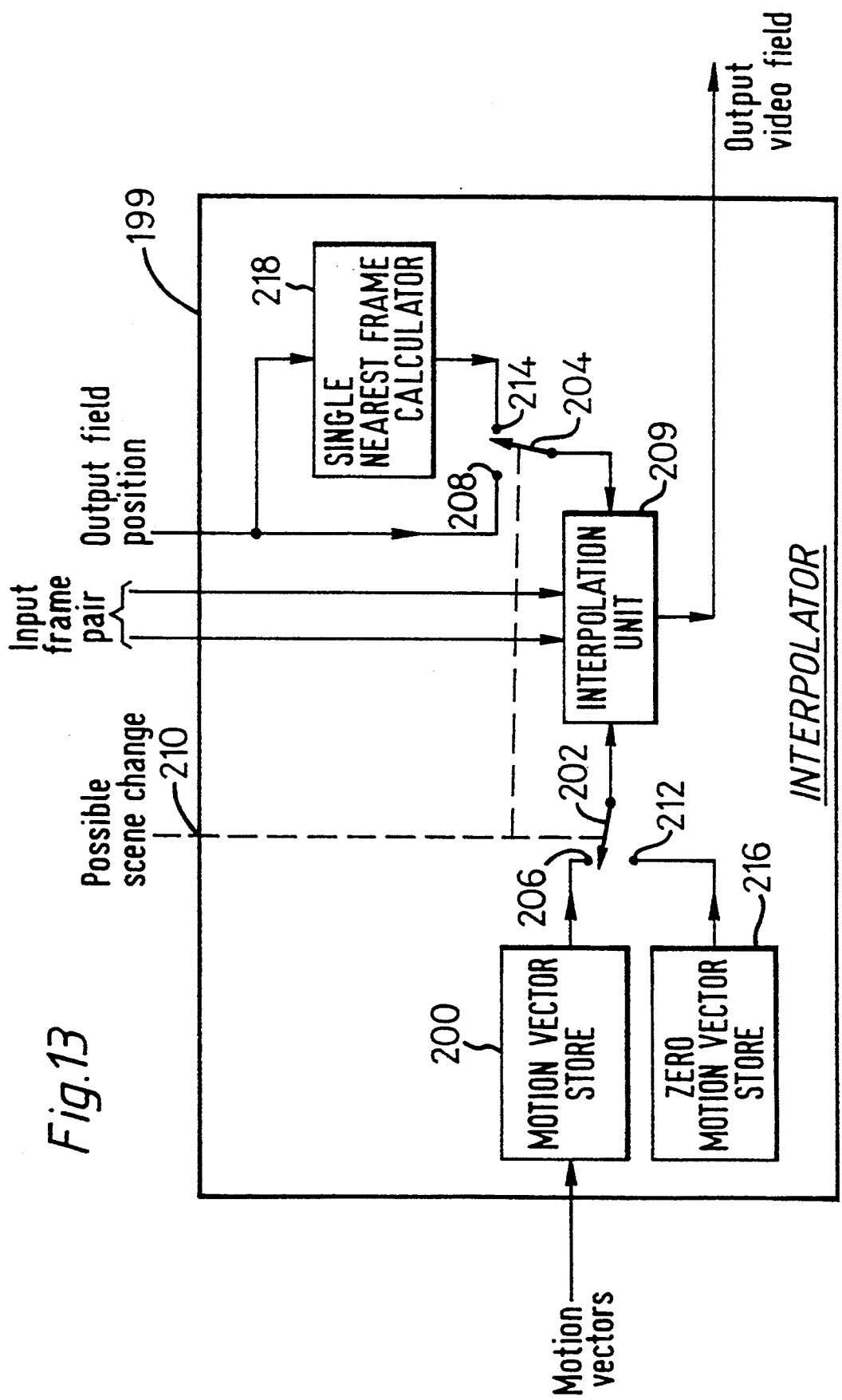
FIG. 13 shows a modified interpolator for performing intraframe generation of an output image when a possible scene change is detected.

FIG. 13 shows one way in which the operation of the interpolator can be modified when a possible scene change is detected by the analyzer 170 or the analyzer 190.

A modified interpolator 199 is shown, which receives a pair of input frames from the system delay compensator at the same time as it receives a set of motion vectors from the motion vector post-processor 36. The set of motion vectors received is that set generated from the two input frames currently being supplied to the interpolator 199 (in the case of an even output field) or (in the case of an odd output field) that set generated from the pair of input frames corresponding to a temporally adjacent even output field, and is stored in a motion vector store 200. The interpolator 199 also receives control information from the time base changer (suitably delayed by the system delay compensator 30) generated at the steps 98 and 100 in FIG. 8 and indicative of the temporal position of the required output field with respect to the pair of input frames.

For normal operation (i.e. when a possible scene change has not been indicated by the analyzer) two switches 202 and 204 in the interpolator are set to 'normal' positions 206 and 208 respectively. An interpolation unit 209 interpolates the output field as described above with reference to FIG. 10, in that each pixel 156 in the output field 150 is derived from a portion 160 of the preceding input frame 152 and a portion 162 of the following input frame 154, the position of the portions 160, 162 being dependent upon the motion vector 158 corresponding to the pixel 156 and upon the temporal position of the output field 150 with respect to the preceding input frame 152 and the following input frame 154.

The interpolator also receives an input 210 from the analyzer on which a possible scene change relating to the pair of input frames from which the set of motion vectors was generated (i.e. not necessarily the pair of frames to be used for interpolation) can be indicated. When a possible scene change is indicated the switches 202 and 204 are set to 'scene change' positions 212 and 214 respectively. This has two effects on the operation of the interpolator 199: one effect is that the interpolation unit 209 uses a set of zero motion vectors stored in a zero motion vector store 216 instead of the set stored in the motion vector store 200, and another effect is that the output field position is substituted by a value calculated by a single nearest frame calculator 218.

As far as the interpolation unit 209 is concerned, when a possible scene change is indicated on the input 210 the interpolation operation proceeds as normal to produce a field of the output video signal. However, this operation is carried out using a set of motion vectors from the zero motion vector store 216, all of which are the zero motion vector, and also using a substituted output field position calculated by the single nearest frame calculator 218 which specifies to the interpolation unit 209 that the output field is temporally coincident with the nearer of the preceding input frame and the following input frame.

FIGS. 14 and 15 show the operation of the modified interpolator shown in FIG. 13 when a possible scene change is detected by the analyzer (170 or 190) and indicated to the interpolator on the input 210. FIG. 14 shows the situation when the temporal position of the output field 150 is closer to that of the preceding input frame 152 than it is to that of the following input frame 154. Conversely, FIG. 15 shows the situation when the temporal position of the output field 150 is closer to that of the following input frame 154 than it is to the position of the preceding input frame 152.

When a possible scene change is indicated on the input 210 to the interpolator 199 in FIG. 6, the switch 202 selects the 'scene change' position 212, causing a set of zero motion vectors to be used. This is illustrated in FIGS. 14 and 15 in which a zero motion vector 220 is used for derivation of the output field 150. Also, when a possible scene change is indicated on the input 210 to the interpolator 199 in FIG. 13, the switch 204 selects the 'scene change' position 214. The effect of this, as mentioned above, is that instead of receiving a signal indicative of the temporal position of the output field with respect to the preceding input frame 152 and the following input frame 154, the interpolation unit 209 receives a signal indicating that the output field 150 is temporally coincident with the nearer of the preceding input frame 152 and the following input frame 154. This has the effect that an apparently normal interpolation process can be performed, but the output field produced by the interpolation unit is dependent entirely on the nearer input frame specified by the single nearest frame calculator 218 and not dependent at all on the other of the two input frames.

In FIG. 14 the output field 150 is closer to the preceding input frame 152 than to the following input frame 154, so each pixel 156 in the output field 150 is dependent only upon a portion 160 of the preceding input frame. The position of the portion 160 in the preceding input frame 152 corresponds to the position of the pixel 156 in the output field 150 because a zero motion vector 220 is used. Similarly, in FIG. 15 the output field 150 is temporally closer to the following input frame 154 than to the preceding input frame 152, so each pixel 156 in the output field is dependent only upon a portion 162 in the following input frame 154. Again, the portion 162 is at a position in the following input frame 154 corresponding to the position of the pixel 156 in the output field 150 because a zero motion vector 220 is used.

Figure 16:
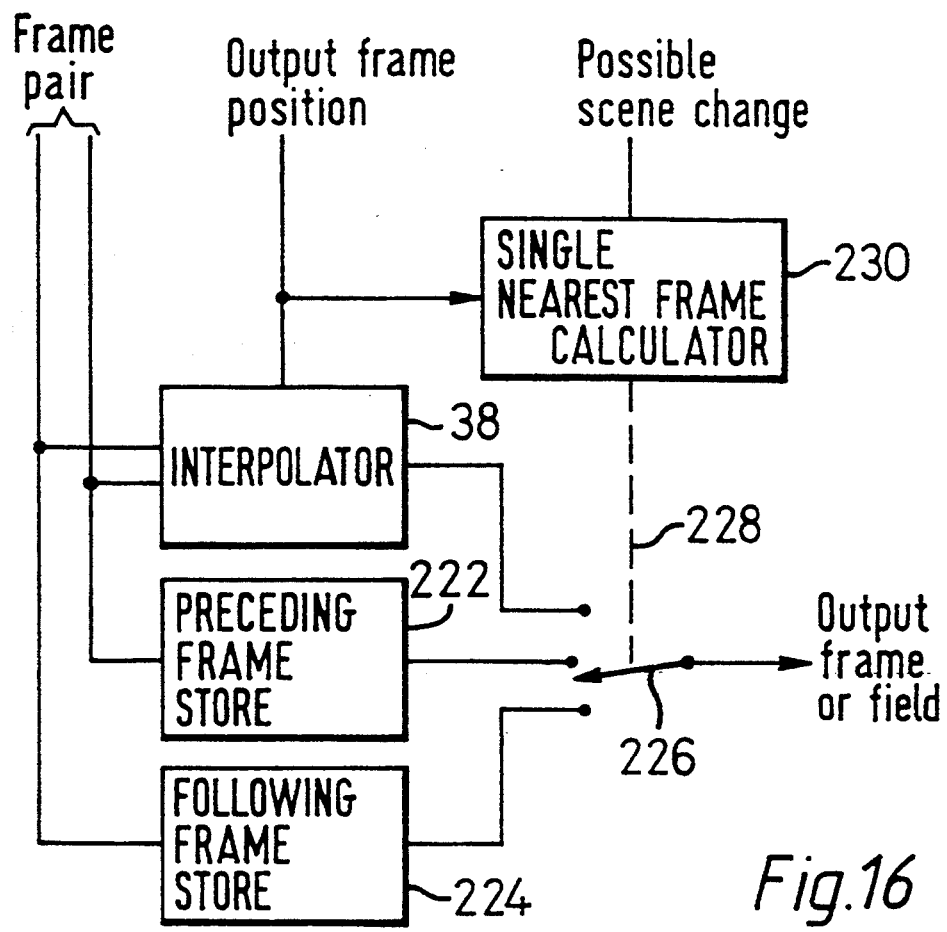
FIGS. 16 and 17 show alternative modifications to the apparatus of FIGS. 3 or 7 for performing intraframe generation of an output image when a possible scene change is detected.
Figure 17:
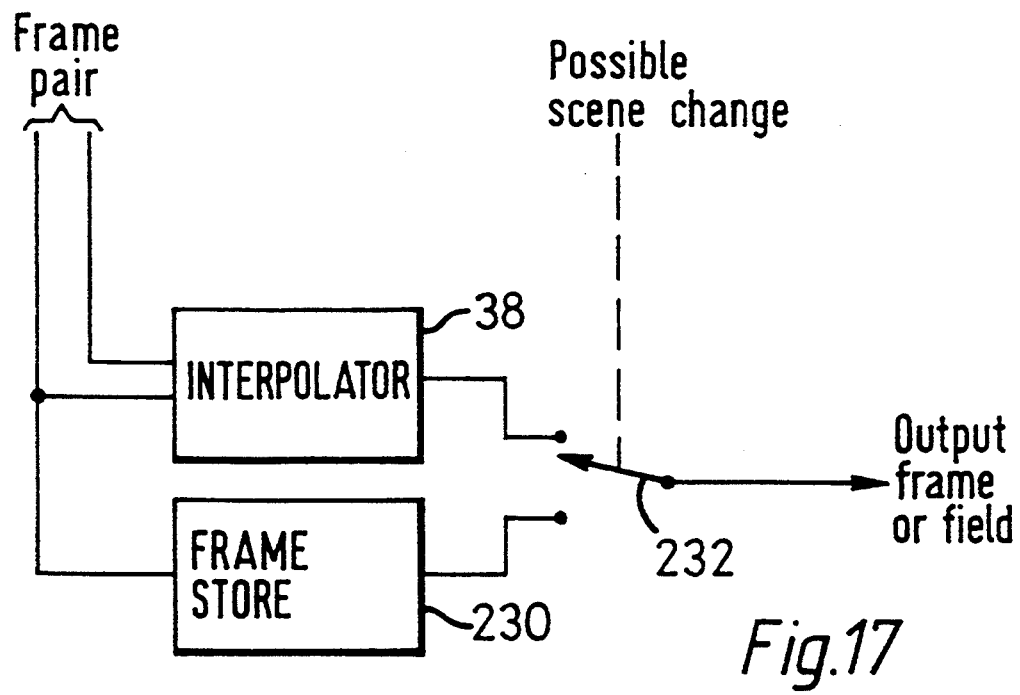

FIGS. 16 and 17 are schematic diagrams illustrating a second way in which the apparatus shown in FIGS. 3 or 7 can be modified so as to change the way in which output fields are derived when a possible scene change is detected by the analyzer (170 or 190).

In FIG. 16 the pair of input frames selected by the time base changer 14 for use in the derivation of an output field are suitably delayed by the system delay compensator 30 and are routed to the interpolator 38 and to two respective frame stores, namely a preceding frame store 222 and a following frame store 224. A switch 226 selects between the outputs of the interpolator 38, the preceding frame store 222 and the following frame store 224, under the control of a control signal 228. The control signal 228 is calculated by a single nearest frame calculator 230 which is responsive to an input from the analyzer indicating whether a possible scene change in the input video signal has been detected, and to an input indicative of the temporal position of the current output field with respect to the pair of input frames. When a possible scene change is not indicated the control signal 228 controls the switch 226 to select the output of the interpolator 38. When a possible scene change is indicated, the single nearest frame calculator determines whether the preceding input frame or the following input frame is closer to the temporal position of the required output field and causes the switch 226 to select the output of the preceding frame store 222 or the following frame store 224 as appropriate. Depending on whether the current output field is an odd or an even output field. The contents of the selected frame store are subsampled (with or without a filtering process) so that only the odd or the even lines in the selected frame store are used to form the output field.

A simpler embodiment is shown in FIG. 17, in which a single frame store 230 stores a predetermined one of the input frames. A switch 232 selects between the output of the frame store and the output of the interpolator 38, in response to a control signal indicating whether a possible scene change has been detected by the analyzer 170. In operation, the switch 232 simply selects the output of the interpolator 38 when a possible scene change has not been detected and selects the output of the frame store 230 when a possible scene change has been detected. As before, the output Field is a subsampled version of the contents of the frame store 130.

The apparatus shown in FIGS. 16 and 17 may be used in situations such as video to film conversion when the required interpolated output images are video frames rather than interlaced video fields, by supplying all of the lines of image data in the appropriate frame store 222, 224 or 230 as an output image.

As described above the analyzer 170 detects possible scene changes by detecting a change in the proportion of good motion vectors in successive sets of motion vectors. Therefore, in order for the analyzer 170 to detect a scene change in the input video signal, it is necessary for a set of motion vectors to be generated from the two input frames either side of the scene change. If the analyzer 170 is used in conjunction with the previously proposed apparatus described above with reference to FIG. 1, this requirement does not cause a problem because every pair of input frames from which an output field is interpolated has a set of motion vectors generated from it. The analyzer 170 could therefore detect any relevant scene changes occurring between those pairs of input frames from which the output fields are interpolated. A scene change between a pair of temporally adjacent input frames from which an output field is not calculated does not have a detrimental effect on the operation of the interpolator 38 and so need not be detected by the analyzer 170.

However, when sets of motion vectors are generated from pairs of input frames corresponding to even output fields only, it is possible that a pair of input frames either side of a scene change in the input video signal could be used to interpolate an odd output field without there having been a set of motion vectors generated from that pair of input frames. The result of this would be that the analyzer 170 would be unable to detect the scene change.

Similarly, the analyzer 190 detects possible scene changes by detecting a change in the frequencies of occurrence of the three global vectors selected by the motion vector reducer 26. The analyzer 190 therefore relies on there being good motion vectors in each set of motion vectors.

Figure 18:
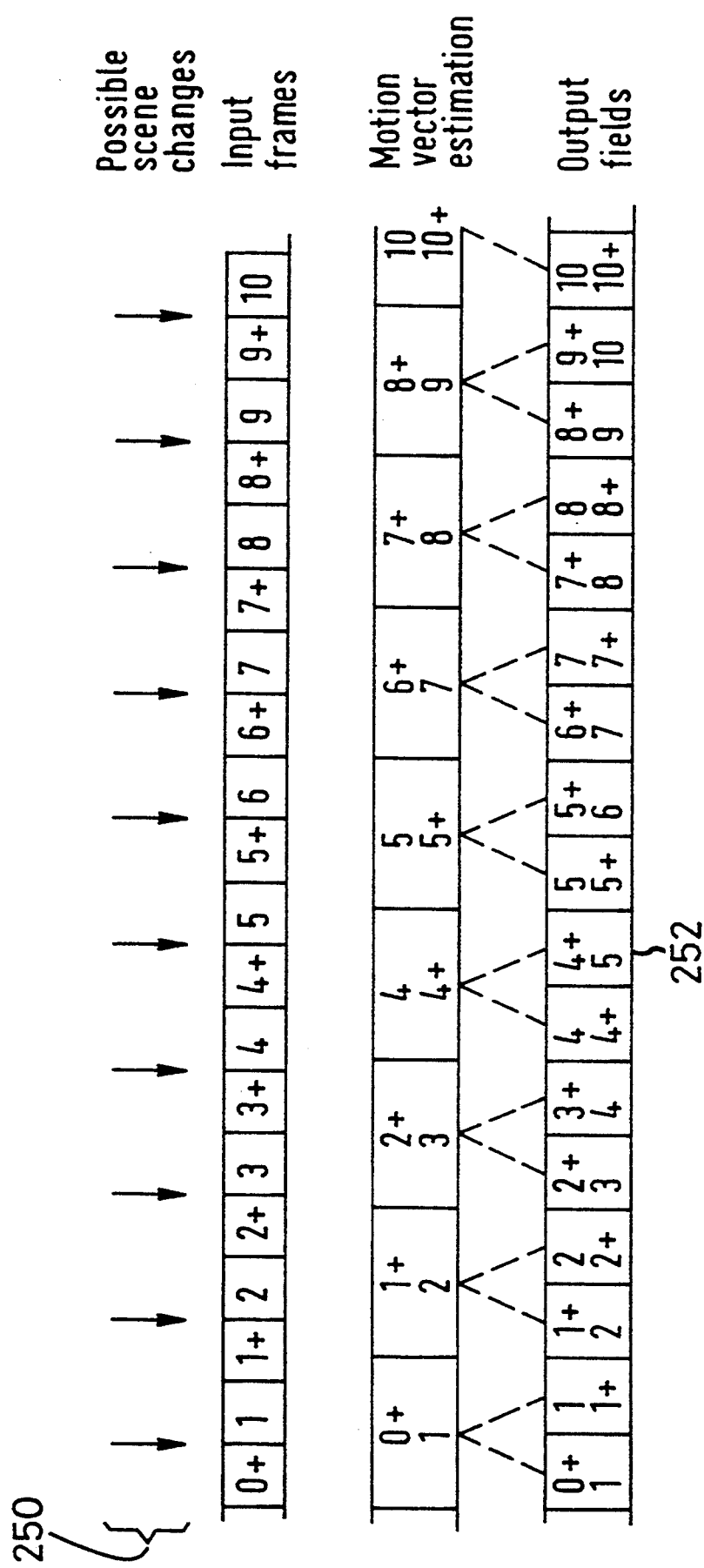
FIG. 18 illustrates the positions of possible scene changes in an input video signal.

FIG. 18 is similar to FIG. 4 described above, in that it shows sets of motion vectors being generated from the pairs of downconverted input frames corresponding to even output fields, these motion vectors then being re-used for the odd output field following that even output field, The positions in the input video signal of possible scene changes are indicated by a row 250 of vertical arrows. It is assumed here that scene changes will occur between adjacent frames of the original input signal (i.e. before progressive scan conversion).

As mentioned above, the analyzer 170 relies on there being a set of motion vectors derived from temporally adjacent input frames either side of a scene change in order to detect that scene change. Referring to FIG. 18, it will be seen that the possible scene change positions lie between the input frames 0+ and 1; 1+ and 2; 2+ and 3; 3+ and 4 and so on. However, when sets of motion vectors ape produced fop only the even output fields, only some of the pairs of temporally adjacent input frames either side of the possible scene change positions will have sets of motion vectors derived from them. For example, a scene change may occur between the input frames 4+ and 5 which ape used fop the interpolation of an odd output field 252. Because the output field 252 is an odd output field, a set of motion vectors derived from a pair of temporally adjacent input frames corresponding to an adjacent even output field is used duping interpolation of that odd output field 252. Therefore if a scene change had occurred between the input frames 4+ and 5, the output field 252 could be interpolated from them without the analyzer 170 having detected that scene change.

Similarly, scene change detection using the analyzer 190 relies on there being good motion vectors in the sets of motion vectors. In order to guarantee this, the sets of motion vectors should be generated from pairs of temporally adjacent input frames originating from the same frame of the input video signal (before progressive scan conversion). That is to say, the motion vector generation process should be applied to the frame pairs 1 and 1+; 2 and 2+; 3 and 3+; 4 and 4+ and so on. However FIG. 18 shows that this is not the case for the embodiments described above, in which sets of motion vectors are derived from the pairs of temporally adjacent input frames numbered 0+ and 1; 1+ and 2; 2+ and 3; 4 and 4+ and so on.

Figure 19:
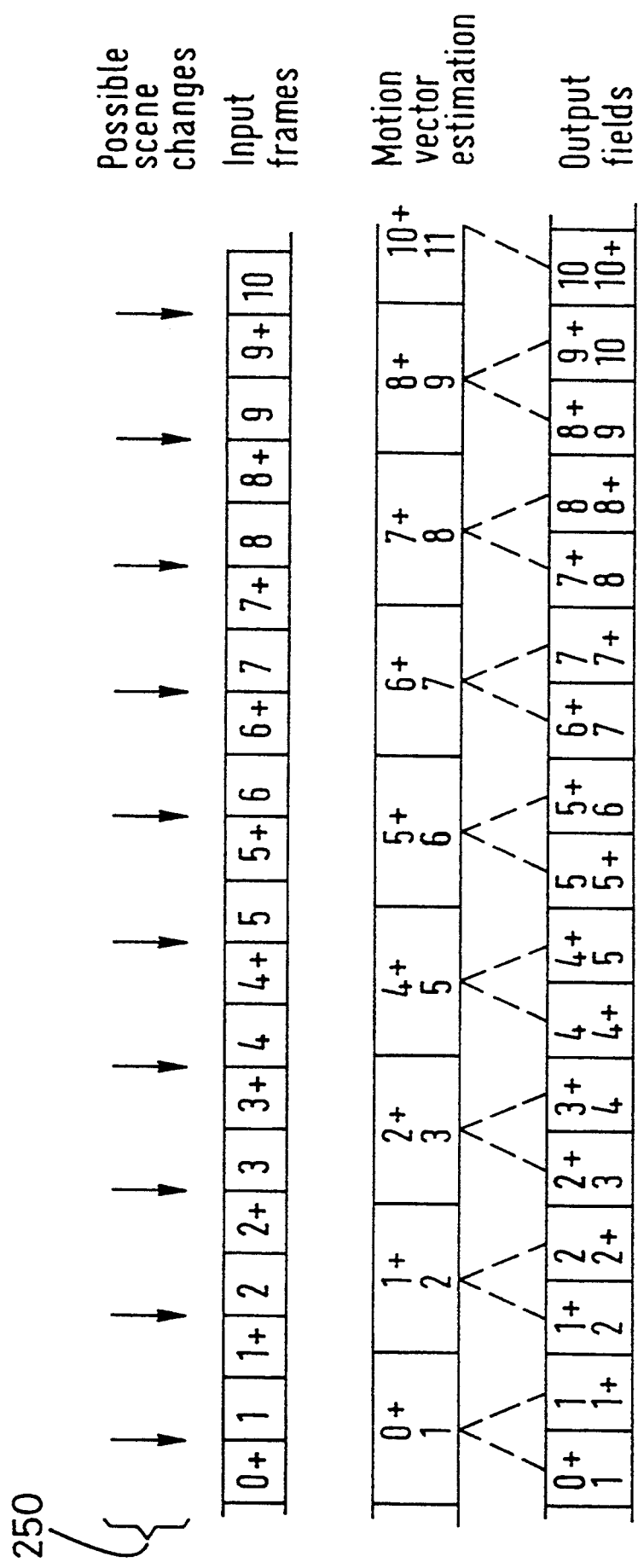
FIGS. 19 and 20 show two alternative selections of input frames from which sets of motion vectors can be derived.

FIG. 19 shows a modification to the selection by the time base changer 55 of the pairs of temporally adjacent input frames from which successive sets of motion vectors ape generated, in order that the analyzer 170 may be able to detect possible scene changes at the majority of the possible scene change positions indicated in the row 250. The pairs of temporally adjacent input frames selected for use in motion vector generation in FIG. 19 are those lying either side of a possible scene change position rather than those to be used in interpolating the even output fields. The pairs selected are therefore 0+ and 1; 1+ and 2; 2+ and 3; 4+ and 5 and so on. The input frame pair 3+ and 4 is not used for motion vector generation although it does represent the position of a possible scene change. Similarly the input frame pair 9+ and 10 is not used for motion vector generation and so on. In fact, fop every twelve-frame sequence of the input frames, one pair of input frames either side of a possible scene change position will not be used for motion vector generation according to the scheme shown in FIG. 19. This means that five out of every six possible scene changes can be detected by the analyzer 170.

Figure 20:
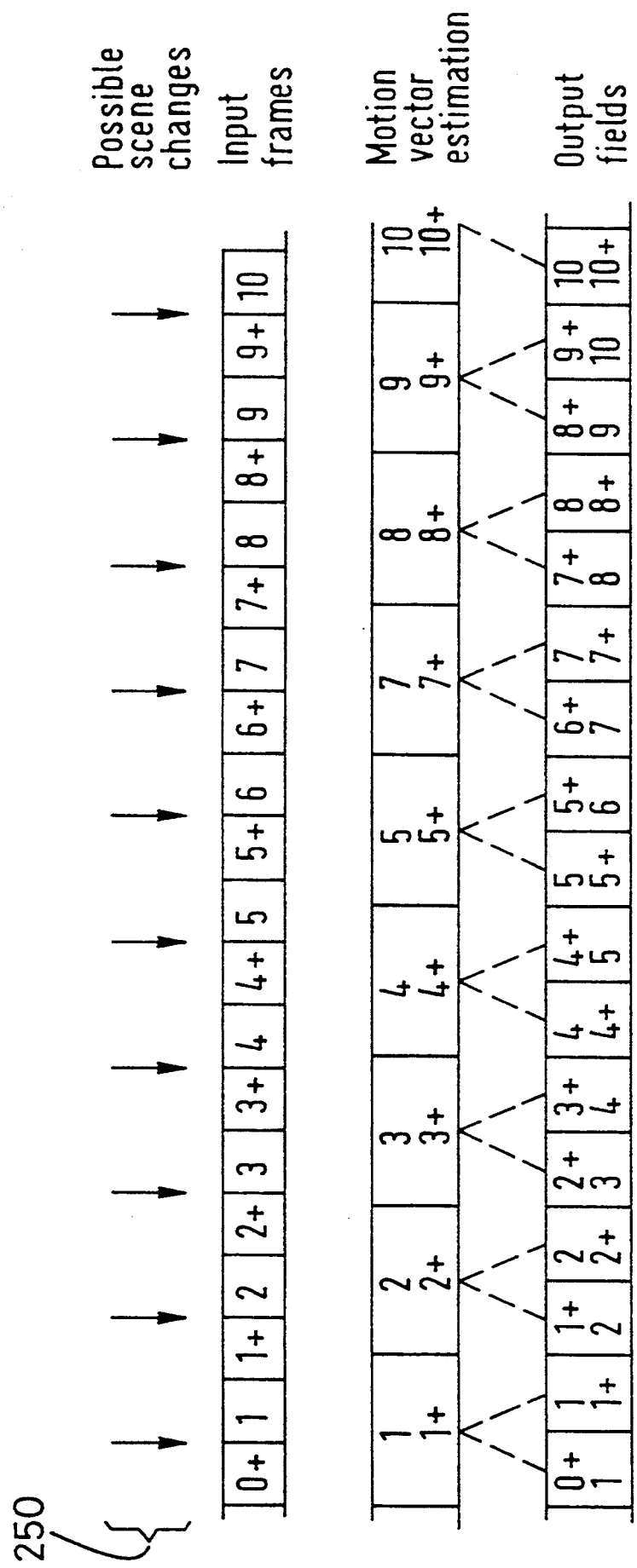

FIG. 20 shows a modification to the pairs of input frames selected by the time base changer 55 for use in the generation of sets of motion vectors, in order that the analyzer 190 can detect the majority of the possible scene changes at the positions indicated in the row 250. The pairs of temporally adjacent input frames used for motion vector generation are those not lying across a possible scene change boundary, namely the pairs 1 and 1+; 2 and 2+; 5 and 3+; 4 and 4+ and so on. In a twelve frame sequence of the input frames, one pair of temporally adjacent input frames relevant to the detection process performed by the analyzer 190 (the pair of input frames numbered 6 and 6+) will not be used for motion vector generation. The result of this is that the analyzer 190 may not be able to detect a scene change between the frame pair 5+ and 6 or between the frame pair 6+ and 7. However, in the twelve-frame sequence, four out of every six possible scene changes could be detected by the analyzer 190 using the scheme shown in FIG. 20.

An embodiment which would allow all of the possible scene changes indicated in the row 250 in FIGS. 18, 19 and 20 to be detected involves the use of analyzer 190 and the analyzer 170 in parallel, in conjunction with the selection of pairs of input frames for motion vector estimation shown in FIG. 19. As mentioned above, in a twelve-frame sequence 0+ to 6, the analyzer 170 would be able to detect five out of the six possible scene changes. The possible scene change which could not be detected by the analyzer 170 in FIG. 19 is that between the input frames 3+ and 4. However, assuming that each scene in the input video signal lasts for more than two of the input frames (one frame of the input video signal before progressive scan conversion), the sets of motion vectors generated from the frame pairs 2+ and 3, and 4+ and 5, would be suitable for use by the analyzer 190 since these pairs would not have included a scene boundary. Therefore a scene change at the position between the frames 3+ and 4 could be detected by a simple logical combination of the outputs 84 of the analyzer 170 and the analyzer 190, in which the scene change between the frames 3+ and 4 is indicated if the analyzer 190 indicates a scene change for the frames 4+ and 5 while the analyzer 170 does not indicate a scene change for the frames 2+ and 3, and 4+ and 5.

Figure 21:
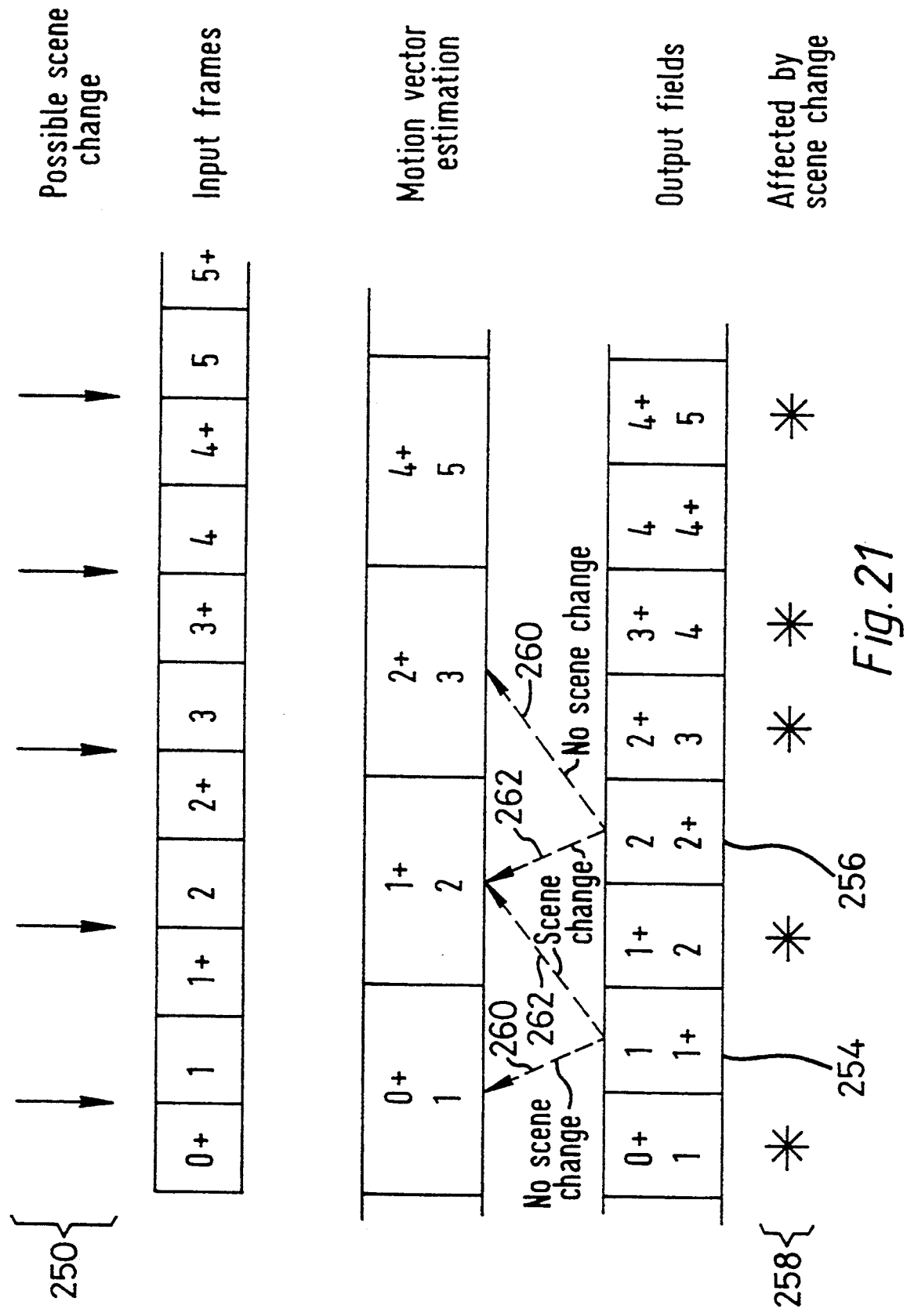
FIG. 21 illustrates the selection of an alternative set of motion vectors for use in interpolating an output field when a possible scene change is detected.

In the embodiments described above, if a scene change was detected relating to a set of motion vectors from which two or more output fields were interpolated, those two or more output fields would be generated by intra-frame processing of one of the corresponding input frames. However, this is unnecessarily cautious since only some of the output fields are interpolated from input frame pairs which may fall across a scene change in the input video signal. This is illustrated in FIG. 21 in which, when a scene change has not been detected, an output field 254 is interpolated from the input frames 1 and 1+ using a set of motion vectors generated from the input frames 0+ and 1 and an output field 256 is interpolated from the input frames numbered 2 and 2+ using a set of motion vectors generated from the input frames 2+ and 3 (as in FIG. 5 described above). These relationships are shown by two arrows 260.

If a scene change is detected between the input frames 0+ and 1 in FIG. 21 the output field interpolated from those input frames would be affected. This is shown by an asterisk in a row 258 of FIG. 21. Using the apparatus described above, that output field would be generated by intra-frame processing of either the frame 0+ or the frame 1. However, there is no reason why the output field 254 should not be interpolated from the input frames 1 and 1+, although not using the set of motion vectors generated from the input frames 0+ and 1. Accordingly, when a scene change is detected as above, a signal is generated and used to control the switch 56 in FIG. 7 to select the alternative set of motion vectors to be used in interpolating the output field 254 namely those generated from the input frames 1+ and 2.

This change of the set of motion vectors used is indicated by a arrow 262 in FIG. 21. Similarly, the output field 256 is interpolated from the input frames 2 and 2+, normally using the set of motion vectors generated from the input frames 2+ and 3. If, however a scene change is detected between the input frames 2+ and 3, the switch 56 can select the alternative set of motion vectors, namely those generated from the input frame pair 1+ and 2. In this way, only one of the output fields need by generated by intra-frame processing when a possible scene change is detected.

Although the embodiments of the invention described above have related to television standards conversion, the techniques used are equally applicable to other forms of motion compensated video signal processing. For example, in a film-to-film standards conversion apparatus, an input telecine apparatus would be connected as an input to, effectively, a television standards conversion apparatus which would then be connected to an output electron beam recorder for rerecording the video information on to film. All of the interpolation processes described above are suitable to be used to produce field- or frame-based output video signals.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Video signal processing apparatus for interpolating pairs of temporally adjacent input images of an input video signal to produce corresponding output images of an output video signal, said video signal processing apparatus comprising:
   a motion vector processor for generating sets of motion vectors from some but not all of said pairs of temporally adjacent input images corresponding to output images;

selecting means for selecting one of said sets of motion vectors for each of said corresponding output images; and motion compensated interpolating means for interpolating said pairs of temporally adjacent input images to produce said corresponding output images using the set of motion vectors respectively selected for said corresponding output images.

2. Video signal processing apparatus according to claim 1, further comprising:

means for receiving an interlaced video signal comprising successive video frames, each frame comprising two video fields; and a progressive scan converter for respectively converting pairs of temporally adjacent video fields in said interlaced video signal into said input images of said input video signal;

and in which said motion vector processor is operable to generate sets of motion vectors only from pairs of temporally adjacent input images originating from a single frame of said interlaced video signal.

3. Video signal processing apparatus according to claim 1, further comprising:

means for receiving an interlaced video signal comprising successive video frames, each frame comprising two video fields; and a progressive scan converter for respectively converting pairs of temporally adjacent video fields in said interlaced video signal into said input images of said input video signal;

and in which said motion vector processor is operable to generate sets of motion vectors only from pairs of temporally adjacent input images originating from different adjacent frames of said interlaced video signal.

4. Video signal processing apparatus according to claim 1, in which said output video signal comprises a plurality of interlaced video fields.

5. Video signal processing apparatus according to claim 1, in which said input video signal comprises a plurality of video frames.

6. Video signal processing apparatus according to claim 5, further comprising:

means for receiving an interlaced video signal comprising pairs of temporally adjacent video fields; and a progressive scan converter for respectively converting said pairs of temporally adjacent video fields in said interlaced video signal into said input images of said input video signal.

7. Video signal processing apparatus according to claim 1, further comprising:

an analyzer for performing a predetermined test for each set of motion vectors to obtain a respective test result indicative of a degree of correlation between said pair of temporally adjacent input images from which that set of motion vectors was generated and for detecting a change of at least a predetermined size in the test results obtained for successive sets of motion vectors as an indication of a possible scene change in said input video signal;

and in which said motion compensated interpolating means is operable to interpolate as a function of the possible scene change indication.

8. Video signal processing apparatus according to claim 7, in which:

said motion compensated interpolating means is operable to interpolate an output image from a pair of temporally adjacent input images using said selected set of motion vectors when a possible scene change is not indicated, and to generate an output image by intra-image processing of one of said pair of input images when a possible scene change is indicated.

9. Video signal processing apparatus according to claim 8, in which, when a possible scene change is indicated and said selected set of motion vectors is not a set generated from a pair of input images corresponding to an output image to be interpolated, said selecting means is operable to select a different set of motion vectors for use in interpolation of that output image.

10. Video signal processing apparatus according to claim 1, in which said motion vector processor is operable to generate sets of motion vectors only from pairs of temporally adjacent input images corresponding to a subset of said output images.

11. Video signal processing apparatus according to claim 1, in which said subset comprises alternate ones of said output images.

12. Video signal processing apparatus according to claim 10, in which:

for an output image in said subset, said selecting means is operable to select said set of motion vectors generated from a pair of input images corresponding to that output image; and for an output image not in said subset, said selecting means is operable to select a set of motion vectors generated from a pair of input images corresponding to another output image temporally adjacent to that output image.

13. Video signal processing apparatus according to claim 12, in which, for an output image not in said subset, said selecting means is operable to select a set of motion vectors generated from a pair of input images corresponding to an output image temporally preceding that output image.

14. Video signal processing apparatus according to claim 12, in which, for an output image not in said subset, said selecting means is operable to select a set of motion vectors generated from a pair of temporally adjacent input images which is closest to a temporal position of that output image.

15. Video signal processing apparatus for interpolating pairs of temporally adjacent input images of an input video signal to produce corresponding output images of an output video signal, said video signal processing apparatus comprising:

a motion vector processor for generating sets of motion vectors only from pairs of temporally adjacent input images corresponding to a subset of said output images;

selecting means for selecting, for an output image in said subset, the set of motion vectors generated from a pair of input images corresponding to that output image, and for selecting, for an output image not in said subset, a set of motion vectors generated from a pair of temporally adjacent input images which is closest to a temporal position of that output image, said selecting means including means for assigning an index number to each of said input images, each said index number representing a temporal position of a respective input image, means for calculating an index number representing a temporal position of each of said output images, and means for selecting a set of motion vectors, for use in interpolation of an output image, generated from a pair of input images having index numbers closest to said index number of that output image; and motion compensated interpolating means for interpolating said pairs of temporally adjacent input images to produce said corresponding output images using the set of motion vectors respectively selected for said corresponding output images.

16. Video signal processing apparatus for interpolating pairs of temporally adjacent input images of an input video signal to produce corresponding output images of an output video signal, said video signal processing apparatus comprising:

a motion vector processor for generating sets of motion vectors only from pairs of temporally adjacent input images corresponding to a subset of said output images;

selecting means for selecting, for an output image in said subset, the set of motion vectors generated from a pair of input images corresponding to that output image, and for selecting, for an output image not in said subset, a set of motion vectors generated from a pair of temporally adjacent input images which is closest to a temporal position of that output image, said selecting means including a switchable delay for selectively delaying said sets of motion vectors for use in interpolating an output image not in said subset, thereby selecting between a current set of motion vectors and a previous set of motion vectors; and motion compensated interpolating means for interpolating said pairs of temporally adjacent input images to produce said corresponding output images using the set of motion vectors respectively selected for said corresponding output images.

17. Video signal processing apparatus for interpolating pairs of temporally adjacent input images of an input video signal to produce corresponding output images of an output video signal, said video signal processing apparatus comprising:

a motion vector processor for generating sets of motion vectors from some but not all of said pairs of temporally adjacent input images corresponding to output images;

selecting means for selecting one of said sets of motion vectors for each of said corresponding output images;

an analyzer for performing a predetermined test for each set of motion vectors to obtain a respective test result indicative of a degree of correlation between said pair of temporally adjacent input images from which that set of motion vectors was generated and for detecting a change of at least a predetermined size in said test results obtained for successive sets of motion vectors, thereby indicating a possible scene change in said input video signal; and motion compensated interpolating means for interpolating said pairs of temporally adjacent input images to produce said corresponding output images using the set of motion vectors respectively selected for said corresponding output images when a possible scene change is not indicated, and for performing intra-image processing of respective images of said pairs of temporally adjacent input images to produce said corresponding output images when a possible scene change is indicated, said motion compensated interpolating means including means for receiving a control signal indicative of a temporal position of an output image to be interpolated wit respect to temporal positions of said corresponding pair of temporally adjacent input images; means responsive to said control signal for setting relative proportions of said corresponding pair of input images to be used in interpolation of said output image in dependence on said temporal position of said output image when a possible scene change is not indicated; means for setting the relative proportions of the corresponding pair of input images to be used in interpolation of said output image so that said output image depends on the content of a selected one of said pair of input images when a possible scene change is indicated; and interpolation means for generating said output image by combining said corresponding pair of input images according to said relative proportions.

18. Video signal processing apparatus according to claim 17, in which said selected one of said pair of input images is that input image which is temporally closest to said output image.

19. Video signal processing apparatus for interpolating pairs of temporally adjacent input images of an input video signal to produce corresponding output images of an output video signal, said video signal processing apparatus comprising:

a motion vector processor for generating sets of motion vectors from some but not all of said pairs of temporally adjacent input images corresponding to output images;

an analyzer for performing a predetermined test for each set of motion vectors to obtain a respective test result indicative of a degree of correlation between said pair of temporally adjacent input images from which that set of motion vectors was generated and for detecting a change of at least a predetermined size in said test results obtained for successive sets of motion vectors, thereby indicating a possible scene change in said input video signal;

selecting means for selecting one of said sets of motion vectors for each of said corresponding output images and for selecting a different set of motion vectors when a possible scene change is indicated and the selected set of motion vectors was not generated from the pair of input images corresponding to the respective output image; and motion compensated interpolating means for interpolating said pairs of temporally adjacent input images to produce said corresponding output images using the set of motion vectors respectively selected for said corresponding output images when a possible scene change is not indicated, and for performing intra-image processing of respective images of said pairs of temporally adjacent input images to produce said corresponding output images when a possible scene change is indicated, said motion compensated interpolating means including means for setting said set of motion vectors to be used in interpolation to a set of zero motion vectors when a possible scene change is indicated.

20. Video signal processing apparatus for interpolating pairs of temporally adjacent input images of an input video signal to produce corresponding output images of an output video signal, said video signal processing apparatus comprising:

an image store for storing at least one of said pair of input images from which a corresponding output image is to be interpolated;

a motion vector processor for generating sets of motion vectors from some but not all of said pairs of temporally adjacent input images corresponding to output images;

selecting means for selecting one of said sets of motion vectors for each of said corresponding output images;

an analyzer for performing a predetermined test for each set of motion vectors to obtain a respective test result indicative of a degree of correlation between said pair of temporally adjacent input images from which that set of motion vectors was generated and for detecting a change of at least a predetermined size in said test results obtained for successive sets of motion vectors, thereby indicating a possible scene change in said input video signal;

motion compensated interpolating means for interpolating said pairs of temporally adjacent input images to produce said corresponding output images using the set of motion vectors respectively selected for said corresponding output images; and means responsive to said analyzer indicating a possible scene change for setting said output image to be equal to at least a portion of a stored input image.

21. Video signal processing apparatus for interpolating pairs of temporally adjacent input images of an input video signal to produce corresponding output images of an output video signal, said video signal processing apparatus comprising:

a motion vector processor for generating sets of motion vectors from some but not all of said pairs of temporally adjacent input images corresponding to output images and including means for performing a predetermined confidence test on each motion vector in a set of motion vectors;

selecting means for selecting one of said sets of motion vectors for each of said corresponding output images;

an analyzer for performing a predetermined test for each set of motion vectors to obtain a respective test result indicative of a degree of correlation between said pair of temporally adjacent input images from which that set of motion vectors was generated and for detecting a change of at least a predetermined size in said test results obtained for successive sets of motion vectors, thereby indicating a possible scene change in said input video signal, said analyzer including means for generating a test result dependent upon a proportion of motion vectors, in a set of motion vectors, which passed said confidence test; and motion compensated interpolating means for interpolating said pairs of temporally adjacent input images to produce said corresponding output images using the set of motion vectors respectively selected for said corresponding output images.

22. Video signal processing apparatus for interpolating pairs of temporally adjacent input images of an input video signal to produce corresponding output images of an output video signal, said video signal processing apparatus comprising:

a motion vector processor for generating sets of motion vectors from some but not all of said pairs of temporally adjacent input images corresponding to output images and including means for detecting a predetermined number of most commonly occurring motion vectors in a set of motion vectors;

selecting means for selecting one of said sets of motion vectors for each of said corresponding output images;

an analyzer for performing a predetermined test for each set of motion vectors to obtain a respective test result indicative of a degree of correlation between said pair of temporally adjacent input images from which that set of motion vectors was generated and for detecting a change of at least a predetermined size in said test results obtained for successive sets of motion vectors, thereby indicating a possible scene change in said input video signal, said analyzer including means for generating a test result dependent upon a sum of frequencies of occurrence of said predetermined number of most commonly occurring motion vectors; and motion compensated interpolating means for interpolating said pairs of temporally adjacent input images to produce said corresponding output images using the set of motion vectors respectively selected for said corresponding output images.

23. A television standards converter comprising:

a motion vector processor for generating sets of motion vectors from some but not all of pairs of temporally adjacent input images of an input video signal at a first rate, said pairs of input images corresponding to output images;

selecting means for selecting one of said sets of motion vectors for each of the corresponding output images; and motion compensated interpolating means for interpolating said pairs of temporally adjacent input images to produce said corresponding output images using the set of motion vectors respectively selected for said corresponding output images, said corresponding output images comprising an output video signal at a second rate different than said first rate.

24. A method of interpolating pairs of temporally adjacent input images of an input video signal to produce corresponding output images of an output video signal, said method comprising the steps of:

generating sets of motion vectors from some but not all of said pairs of temporally adjacent input images corresponding to output images;

selecting one of said sets of motion vectors for each of said corresponding output images; and interpolating pairs of temporally adjacent input images to produce said corresponding output images using the set of motion vectors respectively selected for said corresponding output images.

* * * * *